United States Patent
Watanabe et al.

(10) Patent No.: US 12,306,631 B2
(45) Date of Patent: May 20, 2025

(54) ROBOT CONTROL SYSTEM, ROBOT CONTROL METHOD, AND PROGRAM

(71) Applicant: TOYOTA JIDOSHA KABUSHIKI KAISHA, Toyota (JP)

(72) Inventors: Yuta Watanabe, Toyota (JP); Shiro Oda, Toyota (JP); Kei Yoshikawa, Nagoya (JP); Yukinori Kurahashi, Toyota (JP); Takeshi Matsui, Nissin (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 324 days.

(21) Appl. No.: 17/982,688

(22) Filed: Nov. 8, 2022

(65) Prior Publication Data

US 2023/0152811 A1 May 18, 2023

(30) Foreign Application Priority Data

Nov. 12, 2021 (JP) .................. 2021-184499

(51) Int. Cl.
    *G05D 1/00* (2024.01)
(52) U.S. Cl.
    CPC ......... *G05D 1/0214* (2013.01); *G05D 1/0238* (2013.01); *G05D 1/0274* (2013.01)
(58) Field of Classification Search
    CPC .. G05D 1/0214; G05D 1/0238; G05D 1/0274; G05D 1/024; G05D 1/0236; G05D 1/0223; G05D 1/0251; G05D 1/0255; G05D 1/0257; G05D 1/0263; G05D 1/0285; G05D 1/00; G05D 1/617; G05D 1/633; G05D 1/637; G05D 1/0088
    See application file for complete search history.

(56) References Cited

U.S. PATENT DOCUMENTS

| | | | |
|---|---|---|---|
| 2008/0040040 A1* | 2/2008 | Goto | G05D 1/024 701/301 |
| 2009/0043440 A1* | 2/2009 | Matsukawa | G05D 1/0214 701/25 |
| 2021/0157326 A1 | 5/2021 | Takai et al. | |

FOREIGN PATENT DOCUMENTS

| | | | |
|---|---|---|---|
| JP | 2009-110495 A | | 5/2009 |
| JP | 2012068895 A | * | 4/2012 |
| JP | 5076081 B2 | | 11/2012 |
| JP | 2021-086217 A | | 6/2021 |
| JP | 2021172153 A | * | 11/2021 |

* cited by examiner

*Primary Examiner* — Bao Long T Nguyen
(74) *Attorney, Agent, or Firm* — Dinsmore & Shohl LLP

(57) ABSTRACT

A robot control system according to an embodiment is configured to control a mobile robot configured to autonomously move by referring to a map, the robot control system being further configured to: acquire a distance to a nearby object measured by using a range sensor; specify a position of the nearby object on the map according to the distance from a position of the mobile robot to the nearby object; estimate a movement vector indicating a moving speed and a moving direction of the nearby object according to a change in the distance to the nearby object; add a cost for restricting a movement of the mobile robot on the map; and perform control so that the mobile robot moves according to the cost updated according to a result of measurement by the range sensor.

18 Claims, 7 Drawing Sheets

ROBOT CONTROL SYSTEM, ROBOT CONTROL METHOD, AND PROGRAM

CROSS REFERENCE TO RELATED APPLICATIONS

This application is based upon and claims the benefit of priority from Japanese patent application No. 2021-184499, filed on Nov. 12, 2021, the disclosure of which is incorporated herein in its entirety by reference.

BACKGROUND

The present disclosure relates to a robot control system, a robot control method, and a program.

Patent Literature 1 (Japanese Unexamined Patent Application Publication No. 2021-86217) discloses an autonomous mobile system including a conveyance robot. In Patent Literature 1, the conveyance robot is equipped with a sensor for detecting an obstacle in the area around the robot. For the conveyance robot, an entry prohibition space and an entry restriction space are set. When the sensor detects an obstacle entering the entry restriction space, the conveyance robot reduces its moving speed and/or performs an evasive movement.

SUMMARY

It is desired that such a conveyance robot conveys objects more efficiently. For example, it is desirable that when there is a person in the area around such a conveyance robot, the robot moves while avoiding the person.

The present disclosure has been made in order to solve such a problem, and an object thereof is to provide a robot control system, a robot control method, and a program capable of controlling a robot more efficiently.

A first exemplary aspect is a robot control system configured to control a mobile robot configured to autonomously move by referring to a map, the robot control system being further configured to: specify a position of the nearby object on the map according to the distance from a position of the mobile robot to the nearby object; set a setting area including the nearby object onto the map, wherein the setting area has a first end separated from the nearby object by a first distance in a passage direction of a passage and a second end separated from the nearby object by a second distance in a width direction of the passage, and wherein the second distance is shorter than the first distance; add a restriction information for restricting a movement of the mobile robot to the setting area on the map; and perform control so that the mobile robot moves according to the restriction information.

In the above-described robot control system, a size of the setting area in the passage direction may be larger than a size of the setting area in the width direction.

In the above-described robot control system, a movement direction of the nearby object may be estimated based on change of the distance to the nearby object, the first end point may be set as a point separated from the nearby object by the first distance in a forward side in the moving direction, and a third end point may be set as a point separated from the nearby object by a third distance in a backward direction in the moving direction.

In the above-described robot control system, the restriction information may be a cost updated in accordance with measurement result of the range sensor.

In the above-described robot control system, t the range sensor may include a three-dimensional range sensor and a two-dimensional range sensor, the two-dimensional range sensor being able to measure a distance longer than a distance the three-dimensional range sensor can measure.

In the above-described robot control system, the nearby object may be a person or another mobile robot present in an area around the mobile robot.

Another exemplary aspect is a robot control method including controlling a mobile robot configured to autonomously move by referring to a map, the robot control method further including: acquiring a distance to a nearby object measured by using a range sensor; specifying a position of the nearby object on the map according to the distance from a position of the mobile robot to the nearby object; set a setting area including the nearby object onto the map, wherein the setting area has a first end separated from the nearby object by a first distance in a passage direction of a passage and a second end separated from the nearby object by a second distance in a width direction of a passage, and wherein the second distance is shorter than the first distance; adding a restriction information for restricting a movement of the mobile robot on the map; and performing control so that the mobile robot moves according to the restriction information.

In the above-described robot control system, a size of the setting area in the passage direction may be larger than a size of the setting area in the width direction.

In the above-described robot control method, a movement direction of the nearby object may be estimated based on change of the distance to the nearby object, the first end point may be set as a point separated from the nearby object by the first distance in a forward side in the moving direction, and a third end point may be set as a point separated from the nearby object by a third distance in a backward direction in the moving direction.

In the above-described robot control method, the restriction information may be a cost updated in accordance with measurement result of the range sensor.

In the above-described robot control method, the range sensor may include a three-dimensional range sensor and a two-dimensional range sensor, the two-dimensional range sensor being able to measure a distance longer than a distance the three-dimensional range sensor can measure.

In the above-described robot control method, the nearby object may be a person or another mobile robot present in an area around the mobile robot.

Another exemplary aspect is a program for causing a computer to perform a robot control method including controlling a mobile robot configured to autonomously move by referring to a map, the robot control method further comprising: acquiring a distance to a nearby object measured by using a range sensor; specifying a position of the nearby object on the map according to the distance from a position of the mobile robot to the nearby object; set a setting area including the nearby object onto the map, wherein the setting area has a first end separated from the nearby object by a first distance in a passage direction of a passage and a second end separated from the nearby object by a second distance in a width direction of a passage, and wherein the second distance is shorter than the first distance; adding a restriction information for restricting a movement of the mobile robot on the map; and performing control so that the mobile robot moves according to the restriction information.

In the above-described program, a size of the setting area in the passage direction may be larger than a size of the setting area in the width direction.

In the above-described program, a movement direction of the nearby object may be estimated based on change of the distance to the nearby object, the first end point may be set as a point separated from the nearby object by the first distance in a forward side in the moving direction, and a third end point may be set as a point separated from the nearby object by a third distance in a backward direction in the moving direction.

In the above-described program, the restriction information may be a cost updated in accordance with measurement result of the range sensor.

In the above-described program, the range sensor may include a three-dimensional range sensor and a two-dimensional range sensor, the two-dimensional range sensor being able to measure a distance longer than a distance the three-dimensional range sensor can measure.

In the above-described program, the nearby object may be a person or another mobile robot present in an area around the mobile robot.

According to the present disclosure, it is possible to provide a robot control system, a robot control method, and a program capable of controlling a robot more efficiently.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

The present disclosure will be described hereinafter through embodiments of the disclosure, but the present disclosure is not limited to the below-shown embodiments. Further, all the components/structures described in an embodiment are not necessary for solving the problem.
(General Configuration)

Figure 1:
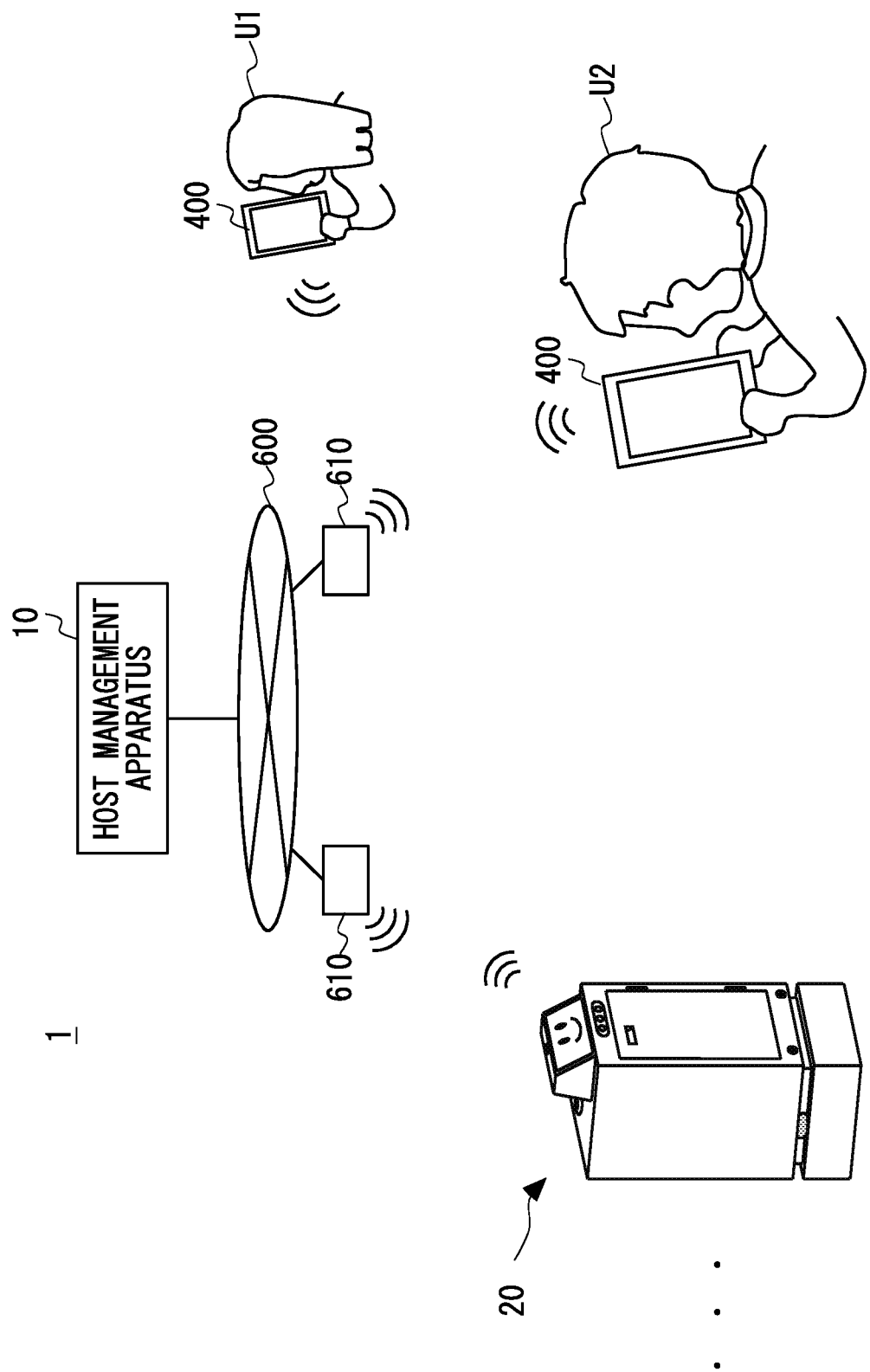
FIG. 1 is a conceptual diagram for explaining an overall configuration of a system in which a mobile robot according to an embodiment is used.

FIG. 1 is a conceptual diagram for explaining an overall configuration of a conveyance system 1 in which a mobile robot 20 according to an embodiment is used. For example, the mobile robot 20 is a conveyance robot that conveys, as its task, an object(s) to be conveyed. The mobile robot 20 autonomously travels in a medical and welfare facility, such as a hospital, a rehabilitation center, a nursing facility, and a facility in which aged persons live, in order to convey objects to be conveyed. Further, the system according to this embodiment can also be used for commercial facilities such as a shopping mall. Hereinafter, the object(s) conveyed by the mobile robot 20 may be referred to as the conveyed-object(s), object(s). item(s), load(s), luggage(s) cargo(s) or goods.

A user U1 stores (i.e., puts) an object to be conveyed in the mobile robot 20 and requests the conveyance thereof. The mobile robot 20 autonomously moves to a set destination so as to convey the goods thereto. That is, the mobile robot 20 performs a task for conveying luggage. In the following description, the place where is the goods are loaded is referred to as a conveyance origin, and the place to which the goods are delivered is referred to as a conveyance destination.

For example, it is assumed that the mobile robot 20 moves in a general hospital having a plurality of clinical departments. The mobile robot 20 conveys supplies, consumable articles, medical instruments, and the like between a plurality of clinical departments. For example, the mobile robot 20 delivers the goods from a nurse station of one clinical department to a nurse station of another clinical department. Alternatively, the mobile robot 20 delivers the goods from a storage room for supplies and medical instruments to a nurse station of a clinical department. Further, the mobile robot 20 delivers medicines prepared in a pharmaceutical department to a clinical department where the medicines are used or a patient who use the medicines.

Examples of the objects to be conveyed include consumable articles such as medicines, bandages, specimens, testing instruments, medical instruments, hospital meals, and stationery. Examples of medical instruments include a sphygmomanometer, a blood transfusion pump, a syringe pump, a foot pump, a nurse-call button, a bed sensor, a low-pressure continuous inhaler electrocardiogram monitor, a medicine infusion controller, an enteral nutrition pump, a respirator, a cuff pressure meter, a touch sensor, an aspirator, a nebulizer, a pulse oximeter, a resuscitator, an aseptic apparatus, and an echo apparatus. Further, the mobile robot 20 may convey meals such as hospital meals and test meals. Further, the mobile robot 20 may convey used apparatuses, used tableware, and the like. When the conveyance destination is located on a floor different from that on which the mobile robot 20 is located, the mobile robot 20 may move to the destination by using an elevator or the like.

The conveyance system 1 includes the mobile robot 20, a host management apparatus 10, a network 600, a communication unit 610, and a user terminal 400. The user U1 or U2 can request the conveyance of the goods through the user terminal 400. For example, the user terminal 400 is a tablet-type computer or a smartphone. However, the user terminal 400 may be any information processing apparatus capable of performing communication wirelessly or thorough a cable.

In this embodiment, the mobile robot 20 and the user terminal 400 are connected to the host management apparatus 10 through the network 600. The mobile robot 20 and the user terminal 400 are connected to the network 600 through the communication unit 610. The network 600 is a wired or wireless LAN (Local Area Network) or a WAN (Wide Area Network). Further, the host management apparatus 10 is connected to the network 600 wirelessly or through a cable. The communication unit 610 is, for example, a wireless LAN unit installed in the environment of its own apparatus or the like. The communication unit 610 may be, for example, a general-purpose communication device such as a WiFi router.

Various signals transmitted from the user terminal 400 of the user U1 or U2 are temporarily sent to the host management apparatus 10 through the network 600, and then transferred (i.e., forwarded) from the host management apparatus 10 to the target mobile robot 20. Similarly, various signals transmitted from the mobile robot 20 are temporarily sent to the host management apparatus 10 through the network 600, and then transferred (i.e., forwarded) from the host management apparatus 10 to the target user terminal 400. The host management apparatus 10 is a server connected to each of the apparatuses, and collects data from each of the apparatuses. Further, the host management apparatus 10 is not limited to a physically single apparatus, and may instead include a plurality of apparatuses over which processes are performed in a distributed manner. Further, the host management apparatus 10 may be formed in a distributed manner over a plurality of edge devices such as the mobile robot 20. For example, a part of or the whole conveyance system 1 may be disposed in the mobile robot 20.

The user terminal 400 and the mobile robot 20 may transmit and receive signals therebetween without any intervention by the host management apparatus 10. For example, the user terminal 400 and the mobile robot 20 may directly transmit and receive signals therebetween through radio communication. Alternatively, the user terminal 400 and the mobile robot 20 may transmit and receive signals therebetween through the communication unit 610.

The user U1 or U2 requests conveyance of the goods by using the user terminal 400. In the following description, it is assumed that the user U1 is a person who is present at a conveyance origin and requests conveyance, and the user U2 is a person who is present at a conveyance destination (a destination) and is an intended recipient. Needless to say, it is also possible that the user U2, which is present at the conveyance destination, can request conveyance. Further, a user who is present at a place other than the conveyance origin and the conveyance destination may request conveyance.

When the user U1 requests conveyance, he/she inputs, by using the user terminal 400, the contents of the goods, the place where the goods are received (hereinafter also referred to as the conveyance origin), the destination of the goods (hereinafter also referred to as conveyance destination), the scheduled (or estimated) arrival time at the conveyance origin (the scheduled receiving time of the object that should be conveyed), the scheduled (or estimated) arrival time at the conveyance destination (the deadline of the conveyance), and the like. Hereinafter, these information items are also referred to as conveyance request information. The user U1 can input conveyance request information by operating a touch panel of the user terminal 400. The conveyance origin may be the place where the user U1 is present or the place where the goods is stored. The conveyance destination is the place where the user U2 or a patient who will use the goods is present.

The user terminal 400 transmits the conveyance request information input by the user U1 to the host management apparatus 10. The host management apparatus 10 is a management system that manages a plurality of mobile robots 20. The host management apparatus 10 transmits an operation command for performing a conveyance task to the mobile robot 20. The host management apparatus 10 determines, for each conveyance request, a mobile robot 20 that will perform that conveyance task. Then, the host management apparatus 10 transmits a control signal including an operation command to that mobile robot 20. The mobile robot 20 moves according to the operation command so that it leaves the conveyance origin and arrives at the conveyance destination.

For example, the host management apparatus 10 assigns a conveyance task to a mobile robot 20 present at or near the conveyance origin. Alternatively, the host management apparatus 10 assigns the conveyance task to a mobile robot 20 which is moving toward the conveyance origin or the vicinity thereof. The mobile robot 20 to which the task is assigned moves to the conveyance origin to collect the goods. The conveyance origin is, for example, the place where the user U1 who has requested the task is present.

When the mobile robot 20 arrives at the conveyance origin, the user U1 or other staff members load (i.e., put) the goods into the mobile robot 20. The mobile robot 20 containing the goods autonomously moves to its destination which is the conveyance destination. The host management apparatus 10 transmits a signal to the user terminal 400 of the user U2 at the conveyance destination. In this way, the user U2 can know that the goods are being conveyed and know its scheduled arrival time. When the mobile robot 20 arrives at the set conveyance destination, the user U2 can receive the goods stored in the mobile robot 20. In this manner, the mobile robot 20 performs the conveyance task.

In the above-described overall configuration, the components of the control system can be distributed over the mobile robot 20, the user terminal 400, and the host management apparatus 10, and the whole control system can be constructed in a distributed manner. Alternatively, the control system can be constructed by collectively disposing all the substantial components for carrying out the conveyance of the goods in one apparatus. The host management apparatus 10 controls one or a plurality of mobile robots 20.

In this embodiment, the mobile robot 20 autonomously moves by referring to a map. The robot control system that controls the mobile robot 20 acquires distance information indicating a distance to a person measured by using a range sensor. The robot control system estimates a movement vector indicating the moving speed and the moving direction of the person according to the change in the distance to the person. The robot control system adds costs for restricting the movement of the mobile robot on the map. The robot control system controls to the mobile robot so that the mobile robot moves according to the costs that are updated according to the result of the measurement by the range sensor. The robot control system may be installed in the mobile robot 20, and/or a part of or the whole the robot control system may be installed in the host management apparatus 10.

(Control Block Diagram)

Figure 2:
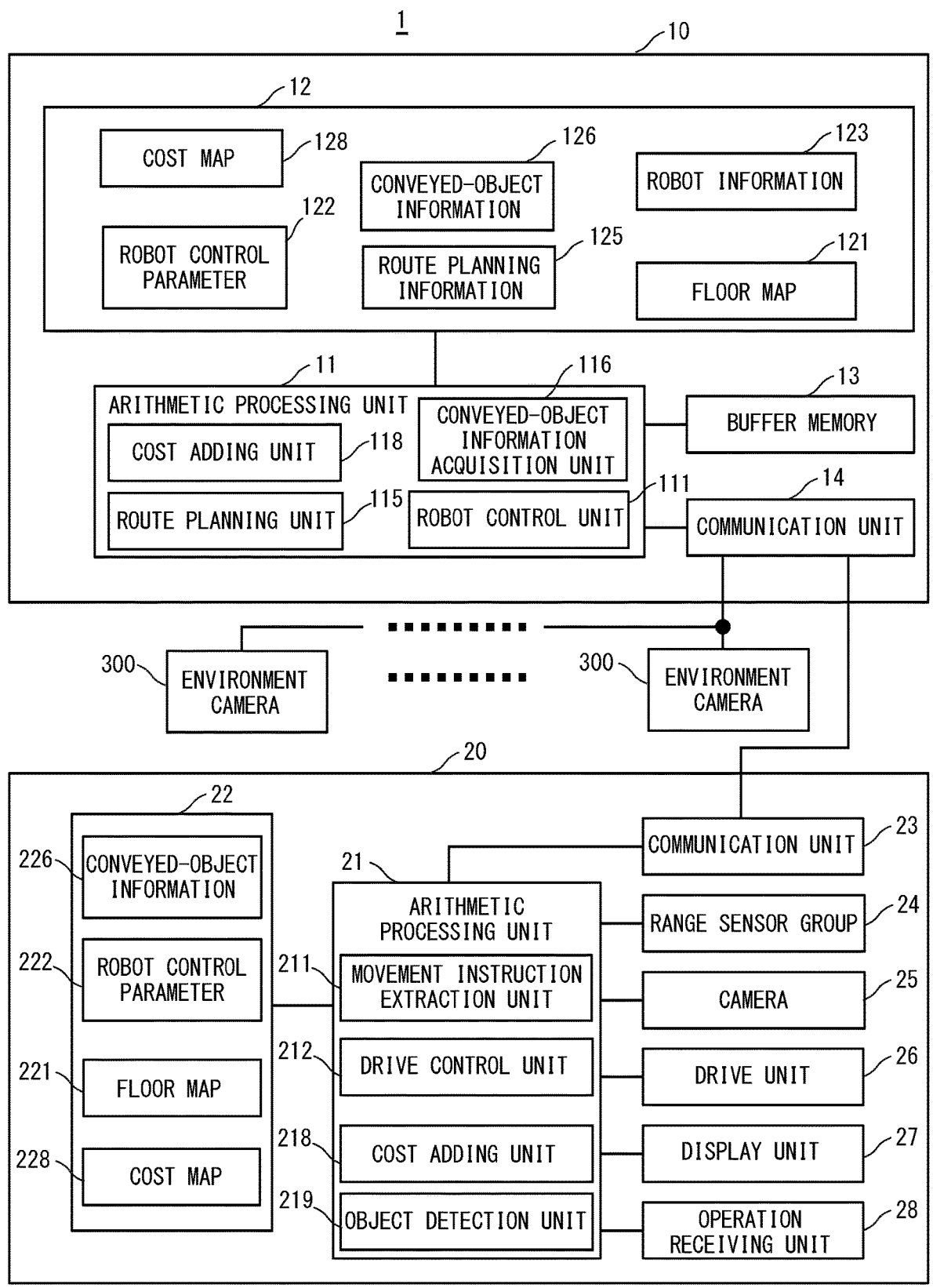
FIG. 2 is a control block diagram of a control system according to an embodiment.

FIG. 2 is a control block diagram showing a control system of a system 1. As shown in FIG. 2, the system 1 includes a host management apparatus 10, a mobile robot 20, and environment cameras 300.

This system 1 efficiently controls a plurality of mobile robots 20 while making the mobile robots 20 autonomously move in a certain facility. To do so, a plurality of environment cameras 300 are installed in the facility. For example, the environment cameras 300 are installed in a passage, a hall, an elevator, a doorway, and the like in the facility.

The environment cameras 300 acquire images of a range in which the mobile robots 20 moves. Note that, in the system 1, the host management apparatus 10 collects images acquired by the environment cameras 300 and information obtained based thereon. Alternatively, images and the like acquired by the environment cameras 300 may be directly transmitted to the mobile robots. Each of the environment cameras 300 may be a monitoring camera or the like provided in a passage or a doorway in the facility. The environment cameras 300 may be used to determine the distribution of congestion states in the facility.

In the system 1 according to the first embodiment, the host management apparatus 10 performs route planning based on conveyance request information. Based on the route planning information created by the host management apparatus 10, the host management apparatus 10 instructs each of the mobile robots 20 about its destination. Then, the mobile robot 20 autonomously moves toward the destination designated by the host management apparatus 10. The mobile robot 20 autonomously moves toward the destination by using sensors, a floor map, position information, and the like provided in the mobile robot 20 itself.

For example, the mobile robot 20 travels so as not to collide with any of apparatuses, objects, walls, or people in the area around the mobile robot 20 (hereinafter collectively referred to as nearby objects). Specifically, the mobile robot 20 detects a distance to a nearby object and travels while keeping at least a certain distance (also referred to as a threshold distance) from the nearby object. When the distance to the nearby object decreases to the threshold distance or shorter, the mobile robot 20 decelerates or stops. In this way, the mobile robot 20 can travel without colliding with the nearby object. Since the mobile robot 20 can avoid colliding with a nearby object, it can convey the goods safely and efficiently.

The host management apparatus 10 includes an arithmetic processing unit 11, a storage unit 12, a buffer memory 13, and a communication unit 14. The arithmetic processing unit 11 performs calculation for controlling and managing the mobile robots 20. The arithmetic processing unit 11 can be implemented, for example, as an apparatus capable of executing a program, such as a central processing unit (CPU: Central Processing Unit) of a computer. Further, various functions can be implemented by the program. Although only a robot control unit 111, a route planning unit 115, a conveyed-object information acquisition unit 116, and a cost adding unit 118, which are characteristic of the arithmetic processing unit 11, are shown in FIG. 2, other processing blocks may also be provided in the arithmetic processing unit 11.

The robot control unit 111 performs calculation for remotely controlling the mobile robot 20, and thereby generates a control signal. The robot control unit 111 generates the control signal based on route planning information 125 (which will be described later). Further, the robot control unit 111 generates the control signal based on various types of information obtained from the environment cameras 300 and the mobile robots 20. The control signal may include update information such as a floor map 121, robot information 123, and robot control parameters 122 (which will be described later). That is, when any of the various types of information is updated, the robot control unit 111 generates a control signal corresponding to the updated information.

The cost adding unit 118 adds costs on the floor map 121. The cost adding unit 118 associates costs with positions on the floor map 121. In other words, the cost adding unit 118 calculates a cost for each position on the floor map 121. The costs are information for restricting the movement of the mobile robot 20. For example, the cost is set as a level between 0 and 100. Further, the larger the level is, the more the movement of the mobile robot 20 is restricted. Specifically, the floor map 121 is divided into grids, and thereby is formed as a grid map. Further, the cost adding unit 118 sets a cost in each grid. The mobile robot 20 cannot enter a grid of which the cost is equal to or larger than a predetermined value. Alternatively, the higher the cost is, the more the upper limit value of the moving speed is reduced. The cost adding unit 118 calculates costs at any time according to the surrounding situation. The process performed by the cost adding unit 118 will be described later.

The conveyed-object information acquisition unit 116 acquires information about the goods. The conveyed-object information acquisition unit 116 acquires information about the contents (the type) of an object to be conveyed that a mobile robot 20 is conveying. The conveyed-object information acquisition unit 116 acquires conveyed-object information about the goods that a mobile robot 20 in the error-state is conveying.

The route planning unit 115 performs route planning for each of the mobile robots 20. When a conveyance task is input, the route planning unit 115 performs route planning for conveying the goods to its conveyance destination (the destination) based on conveyance request information. Specifically, the route planning unit 115 determines a mobile robot 20 that will perform the new conveyance task by referring to the route planning information 125, the robot information 123, and the like which have already been stored in the storage unit 12. The start point is, for example, the current position of the mobile robot 20, the conveyance destination of the immediately preceding conveyance task, the place where the goods (i.e., the object that needs to be conveyed from there) are received, or the like. The destination is the conveyance destination of the goods, a waiting place, a charging place, or the like.

In this example, the route planning unit 115 sets passing points between the start point of the mobile robot 20 and the destination thereof. The route planning unit 115 sets, for each mobile robot 20, the passing order of passing points according to which the mobile robot 20 passes the passing points. For example, passing points are set at a branch point, an intersection, a lobby in front of an elevator, a vicinity thereof, and the like. Further, in a narrow passage, it may be difficult for two or more mobile robots 20 to pass each other. In such a case, a passing point may be set in front of the narrow passage. On the floor map 121, candidates for passing points may be registered in advance.

The route planning unit 115 determines (i.e., selects), for each conveyance task, a mobile robot 20 from among the plurality of mobile robots 20 so that tasks are efficiently performed in the whole system. The route planning unit 115 preferentially assigns a conveyance task to a mobile robot 20 on standby or a mobile robot 20 located close to its conveyance origin.

The route planning unit 115 sets passing points including the start point and the destination for the mobile robot 20 to which the conveyance task has been assigned. For example, when there are at least two travelling routes from the conveyance origin to the conveyance destination, the route planning unit 115 sets passing points so that the mobile robot 20 can move from the conveyance origin to the conveyance destination in a shorter time. Therefore, the host management apparatus 10 updates information indicating congestion states of passages based on images taken by cameras or the like. Specifically, the degree of congestion is high in places where other mobile robots 20 are passing or where there are many people. Therefore, the route planning unit 115 sets passing points so as to avoid places in which the degree of congestion is high.

In some cases, the mobile robot 20 can move to the destination in either a counterclockwise traveling route or a clockwise traveling route. In such cases, the route planning unit 115 sets passing points so that the mobile robot 20 travels through the traveling route which is less congested. When the route planning unit 115 sets one or a plurality of passing points between the start point and the destination, the mobile robot 20 can travel through a traveling route which is not crowded. For example, when the passage is divided at a branch point or an intersection, the route planning unit 115 sets passing points at the branch point, the intersection, a corner, and a vicinity thereof. In this way, the conveyance efficiency can be improved.

The route planning unit 115 may set passing points with consideration given to the congestion state of an elevator, a moving distance, and the like. Further, the host management apparatus 10 may estimate the number of mobile robots 20 and the number of people at a certain place at a scheduled time at which the mobile robot 20 will pass the certain place. Then, the route planning unit 115 may set passing points according to the estimated congestion state. Further, the route planning unit 115 may dynamically change passing points according to the change in the congestion state. The route planning unit 115 sequentially sets passing points for the mobile robot 20 to which the conveyance task is assigned. The passing points may include the conveyance origin and the conveyance destination. As will be described later, the mobile robot 20 autonomously moves so as to sequentially pass through the passing points set by the route planning unit 115 (i.e., one after another).

The storage unit 12 is a storage unit in which information necessary for managing and controlling robots are stored. Although the floor map 121, the robot information 123, the robot control parameters 122, the route planning information 125, and the conveyed-object information 126 are shown in the example shown in FIG. 2, other information may also be stored in the storage unit 12. When various types of processing are performed, the arithmetic processing unit 11 performs calculation by using information stored in the storage unit 12. Further, the various types of information stored in the storage unit 12 can be updated to the latest information.

The floor map 121 is map information of the facility where the mobile robots 20 move. This floor map 121 may be created in advance, or may be created from information obtained from the mobile robots 20. Alternatively, the floor map 121 may be one that is obtained by adding map correction information generated from information obtained from the mobile robots 20 to a base map created in advance.

For example, in the floor map 121, locations of wall surfaces, gates, doors, stairs, elevators, fixed shelves, and the like in the facility are recorded. The floor map 121 may be expressed as a 2D (two-dimensional) grid map. In such a case, information about a wall, a door, or the like is added in each grid on the floor map 121.

In the robot information 123, IDs, model numbers, specifications, and the like of the mobile robots 20 managed by the host management apparatus 10 are described (i.e., contained). The robot information 123 may include position information indicating the current positions of the mobile robots 20. The robot information 123 may include information as to whether the mobile robots 20 are performing tasks or are on standby. Further, the robot information 123 may include information indicating whether the mobile robots 20 are in operation or in faulty states. Further, the robot information 123 may include information about the goods that can be conveyed and those that cannot be conveyed.

In the robot control parameters 122, control parameters such as a threshold distance between the mobile robot 20 managed by the host management apparatus 10 and a nearby object are described (i.e., contained). The threshold distance is a margin distance for avoiding collision with nearby objects including people. Further, the robot control parameters 122 may include information related to the operational strength such as a speed upper limit value for the moving speed of the mobile robot 20.

The robot control parameters 122 may be updated according to the situation. The robot control parameters 122 may include information indicating the availability (i.e., the vacancy) or the used state of the storage space of a storage box 291. The robot control parameters 122 may include information about the goods that can be conveyed and those that cannot be conveyed. In the robot control parameters 122, the above-described various types of information are associated with each of the mobile robots 20.

The route planning information 125 includes route planning information planned by the route planning unit 115. The route planning information 125 includes, for example, information indicating a conveyance task. The route planning information 125 may include information such as an ID of the mobile robot 20 to which the task is assigned, the start point, the contents of the goods, the conveyance destination, the conveyance origin, the scheduled arrival time at the conveyance destination, the scheduled arrival time at the conveyance origin, and the deadline of the arrival. In the route planning information 125, the above-described various types of information may be associated with each conveyance task. The route planning information 125 may include at least a part of conveyance request information input by the user U1.

Further, the route planning information 125 may include information about passing points for each mobile robot 20 or each conveyance task. For example, the route planning information 125 includes information indicating the passing order of passing points for each mobile robot 20. The route planning information 125 may include the coordinates of each passing point on the floor map 121 and information as to whether or not the mobile robot 20 has passed the passing point.

A cost map 128 is a map indicating costs added by the cost adding unit 118. Specifically, a cost is associated with a position (an address or coordinates) on the floor map 121. As described above, the cost map 128 may be a grid map in which a cost is recorded in each grid. Every time the cost adding unit 118 adds a cost, the cost map 128 is updated. Note that the cost map 128 may be generated by integrating (i.e., combining) cost maps 228 stored in a plurality of mobile robots 20 into one cost map. That is, the cost map 128 may be generated based on costs added by a plurality of mobile robots.

The conveyed-object information 126 is information about the goods for which a conveyance request has been made. For example, the conveyed-object information 126 includes information such as the contents (the type) of the goods, the conveyance origin, and the conveyance destination. The conveyed-object information 126 may include the ID of the mobile robot 20 in charge of the conveyance. Further, the conveyed-object information may include information indicating a status such as "during conveyance", "before conveyance" ("before loading"), and "conveyed". In the conveyed-object information 126, the above-described information is associated with each conveyed object. The conveyed-object information 126 will be described later.

Note that the route planning unit 115 performs route planning by referring to various types of information stored in the storage unit 12. For example, a mobile robot 20 that will perform a task is determined based on the floor map 121, the robot information 123, the robot control parameters 122, and the route planning information 125. Then, the route planning unit 115 sets passing points up to the conveyance destination and the passing order thereof by referring to the floor map 121 and the like. On the floor map 121, candidates for passing points are registered in advance. Then, the route planning unit 115 sets passing points according to the congestion state and the like. Further, in the case where tasks are successively processed, the route planning unit 115 may set the conveyance origin and the conveyance destination as passing points.

Note that two or more mobile robots 20 may be assigned to one conveyance task. For example, when the volume of the goods is larger than the maximum loading volume of the mobile robot 20, the goods are divided into two loads (i.e., two portions) and loaded in two mobile robots 20, respectively. Alternatively, when the goods are heavier than the maximum loading weight of the mobile robot 20, the goods are divided into two loads and loaded in two mobile robots 20, respectively. By doing so, two or more mobile robots 20 can perform one conveyance task in a shared manner. Needless to say, when the host management apparatus 10 may control mobile robots 20 having different sizes, the route planning unit 115 may perform route planning so that a mobile robot 20 capable of conveying the goods receives the goods (i.e., takes the task of conveying the goods).

Further, one mobile robot 20 may perform two or more conveyance tasks in parallel. For example, one mobile robot 20 is loaded with two or more goods at the same time, and this mobile robot 20 may successively convey them to different conveyance destinations. Alternatively, while one mobile robot 20 is conveying the goods, this mobile robot 20 may load (i.e., collect) other goods. Further, the conveyance destinations of the goods loaded at different locations may be the same as each other or different from each other. In this way, the tasks can be efficiently performed.

In such a case, storage information indicating the used state or the availability state of the storage space of the mobile robot 20 may be updated. That is, the host management apparatus 10 may control the mobile robot 20 by managing the storage information indicating the availability state. For example, when the loading or transporting of the goods is completed, the storage information is updated. When a conveyance task is input, the host management apparatus 10 refers to the storage information, and thereby makes (i.e., instructs) a mobile robot 20 having an empty space in which the goods can be loaded move to the conveyance origin to receive the object to be conveyed. In this way, one mobile robot 20 can perform a plurality of conveyance tasks at the same time, or two or more mobile robots 20 can perform a conveyance task in a shared manner. For example, a sensor may be installed in the storage space of the mobile robot 20, so that the availability state thereof is detected. Further, the volume and the weight of each of the goods may be registered in advance.

The buffer memory 13 is a memory which accumulates (i.e., stores) pieces of intermediate information generated during the processing performed by the arithmetic processing unit 11. The communication unit 14 is a communication interface for communicating with a plurality of environment cameras 300 provided in the facility where the system 1 is used, and communicating with at least one mobile robot 20. The communication unit 14 can perform both communication through a cable and wireless communication. For example, the communication unit 14 transmits, to each mobile robot 20, a control signal necessary for controlling that mobile robot 20. Further, the communication unit 14 receives information collected by the mobile robots 20 and the environment cameras 300.

The mobile robot 20 includes an arithmetic processing unit 21, a storage unit 22, a communication unit 23, proximity sensors (e.g., a group of range sensors 24), a camera(s) 25, a drive unit 26, a display unit 27, and an operation receiving unit 28. Note that although only typical processing blocks provided in the mobile robot 20 are shown in FIG. 2, the mobile robot 20 may include a number of other processing blocks (not shown).

The communication unit 23 is a communication interface for communicating with the communication unit 14 of the host management apparatus 10. The communication unit 23 communicates with the communication unit 14, for example, by using a radio signal. The range sensor group 24 is, for example, composed of proximity sensors, and outputs proximity object distance information indicating a distance to an object or a person present in the area around the mobile robot 20. The camera 25 takes, for example, an image(s) that is used to recognize the situation around the mobile robot 20. Further, the camera 25 can also photograph, for example, position markers provided on the ceiling of the facility pr the like. The mobile robot 20 may recognize its own position by using the position markers.

The drive unit 26 drives a driving wheel(s) provided in the mobile robot 20. Note that the drive unit 26 may include an encoder(s) that detects the number of rotations of the driving wheel(s) or the driving motor(s) thereof. The position (the current position) of the mobile robot 20 itself may be estimated according to the output of the encoder. The mobile robot 20 detects its own current position and transmits it to the host management apparatus 10.

The display unit 27 and the operation receiving unit 28 are implemented by a touch panel display. The display unit 27 displays a user interface screen (e.g., a user interface window) that serves as the operation receiving unit 28. Further, the display unit 27 can display information indicating the destination of the mobile robot 20 and/or the state of the mobile robot 20. The operation receiving unit 28 receives an operation from a user. The operation receiving unit 28 includes various switches provided in the mobile robot 20 in addition to the user interface screen displayed on the display unit 27.

The arithmetic processing unit 21 performs calculation for controlling the mobile robot 20. The arithmetic processing unit 21 can be implemented, for example, as an apparatus capable of executing a program, such as a central processing unit (CPU) of a computer. Further, various functions can be implemented by the program. The arithmetic processing unit 21 includes a movement instruction extraction unit 211, a drive control unit 212, a cost adding unit 218, and an object detection unit 219. Note that although only typical processing blocks provided in the arithmetic processing unit 21 are shown in FIG. 2, the arithmetic processing unit 21 may include other processing blocks (not shown). The arithmetic processing unit 21 may search for a path between passing points. Further, the arithmetic processing unit 21 may determine the route (or the path) by referring to a cost map 228.

The movement instruction extraction unit 211 extracts a movement instruction from the control signal provided from the host management apparatus 10. For example, the movement instruction includes information about the next passing point. For example, the control signal may include information about the coordinates of passing points and the passing order thereof. Further, the movement instruction extraction unit 211 extracts the above-described information as a movement instruction.

Further, the movement instruction may include information indicating that to the mobile robot 20 can move to the next passing point. If a passage is narrow, two or more mobile robot 20 may not pass each other. Further, a passage may be temporarily blocked. In such a case, the control signal includes an instruction to stop the mobile robot 20 at a passing point in front of the place where the mobile robot 20 should stop. Then, after the other mobile robot 20 has passed or after it becomes possible to pass the passage, the host management apparatus 10 outputs, to the mobile robot 20, a control signal for informing the mobile robot 20 that it can move through the passage. As a result, the mobile robot 20, which has temporarily stopped, starts to move again.

The drive control unit 212 controls the drive unit 26 so that the mobile robot 20 moves based on the movement instruction provided from the movement instruction extraction unit 211. For example, the drive unit 26 include a driving wheel(s) that rotates according to a control command value provided from the drive control unit 212. The movement instruction extraction unit 211 extracts a movement instruction so that the mobile robot 20 moves toward a passing point received from the host management apparatus 10. Then, the drive unit 26 rotationally drives the driving wheel(s). The mobile robot 20 autonomously moves toward the next passing point. By doing so, the mobile robot 20 passes through passing points in order (i.e., one after another) and arrives at the conveyance destination. Further, the mobile robot 20 may estimate its own position and transmit a signal indicating that it has passed the passing point to the host management apparatus 10. In this way, the host management apparatus 10 can manage the current position and the conveyance status of each mobile robot 20.

The cost adding unit 218 adds costs on a floor map 221. The cost adding unit 218 associates costs with positions on the floor map 221. In other words, the cost adding unit 218 calculates a cost for each position on the floor map 221. The costs are restriction information for restricting the movement of the mobile robot 20. For example, the cost is set as a level between 0 and 100. Further, the larger the level is, the more the movement of the mobile robot 20 is restricted. Although the upper limit value and the lower limit value of the setting range for costs are set to 100 and 0, respectively, the upper limit value and the lower limit value of the setting range are not limited to these values.

Specifically, the floor map 221 is divided into grids, and thereby is formed as a grid map. Further, the cost adding unit 218 sets a cost for each grid. The mobile robot 20 cannot enter a grid of which the cost is equal to or larger than a predetermined value. Alternatively, the higher the cost is, the more the upper limit value for the moving speed is reduced. The cost adding unit 218 calculates costs at any time according to the surrounding situation. The process performed by the cost adding unit 218 will be described later.

The object detection unit 219 detects a nearby object in the area around the mobile robot 20. Further, when the nearby object is a mobile object such as another mobile robot 20 or a person, the object detection unit 219 estimates the moving speed and the moving direction of the mobile object. Further, the object detection unit 219 may specify (i.e., determine) whether the nearby object is a fixed object fixed in the facility or a mobile object that can move in the facility. Examples of the fixed objects include wall surfaces, doors, desks, and fixed shelves, and information about them is recorded on the floor maps 121 and 221. Example of the mobile objects include other mobile robots, a stretcher, an infusion stand, a movable medical instrument, a shelf with casters, a person, and a wheelchair.

In general, information about mobile objects is not registered on the floor maps 121 and 221. Therefore, the object detection unit 219 can detect whether the nearby object is a fixed object or a mobile object by referring to the floor map 121 or 221. That is, a nearby object of which the position coincides with the position of an object registered on the floor map 221 is regarded as a fixed object. A nearby object of which the position does not coincide with the position of any of the objects registered on the floor map 221 is regarded as a mobile object. The mobile object is not limited to objects, but may be a person or an animal.

The mobile robot 20 estimates its own position on the floor map 121 by using an odometry or the like. Then, the object detection unit 219 can specify the position of a nearby object on the floor map 121 according to the distance from its own position to the nearby object and the direction thereof. The object detection unit 219 determines whether or not the nearby object is registered on the floor map 221. It is possible to acquire the distance to the nearby object and the direction thereof from the measurement result of the range sensor group 24.

Further, the object detection unit 219 may specify a nearby object based on a sensing result of the range sensor group 24, the camera 25, or the like. For example, assuming that the range sensor group 24 includes lidars, it is possible to measure the surface shape of the nearby object. The object detection unit 219 can specify (i.e., identity) the nearby object according to the surface shape. For example, when the nearby object is a person present in the area around the mobile robot 20, the surface shape detected by the range sensor group 24 matches the surface shape of a human being. Alternatively, the object detection unit 219 can specify a nearby object based on an image(s) taken by the camera 25. For example, when the nearby object is a person present in the area around the mobile robot 20, the image taken by the camera 25 matches the reference image of a human being. Therefore, the object detection unit 219 can specify the nearby object as a person (i.e., as a human being). By performing a pattern matching process for the detection results of various sensors, it is possible to specify whether the nearby object is a person or another mobile robot.

In the storage unit 22, the floor map 221, robot control parameters 222, and conveyed-object information 226 are stored. The information shown in FIG. 2 is a part of the information stored in the storage unit 22, and includes information other than the floor map 221, the robot control parameters 222, and the conveyed-object information 226 shown in FIG. 2. The floor map 221 is map information of the facility in which the mobile robots 20 are made to move. This floor map 221 is, for example, a map that is obtained by downloading the floor map 121 stored in the host management apparatus 10. Note that the floor map 221 may be created in advance. Further, the floor map 221 may not be map information for the whole facility, but may be map information for a part of the area in which the mobile robot 20 is supposed to move.

The robot control parameters 222 are parameters for operating the mobile robot 20. The robot control parameters 222 include, for example, a threshold distance to a nearby object. Further, the robot control parameters 222 include an upper limit value of the speed of the mobile robot 20.

Similarly to the conveyed-object information 126, the conveyed-object information 226 includes information about the goods. The conveyed-object information 226 includes information such as the contents (the type), the conveyance origin, the conveyance destination, and the like of the goods. The conveyed-object information may include information indicating a status such as "during conveyance", "before conveyance" ("before loading"), and "conveyed". In the conveyed-object information 226, the above-described information is associated with each of goods. The conveyed-object information 226 will be described later. The conveyed-object information 226 may include information about the goods conveyed by the mobile robot 20. Therefore, the conveyed-object information 226 is a part of the conveyed-object information 126. That is, the conveyed-object information 226 may not include information about goods conveyed by other mobile robots 20.

The drive control unit 212 refers to the robot control parameters 222, and when the distance indicated by the distance information obtained from the range sensor group 24 decreases beyond the threshold distance, makes the mobile robot 20 stops or decelerates. The drive control unit 212 controls the drive unit 26 so that the mobile robot 20 travels at a speed equal to or lower than the upper limit value of the speed thereof. The drive control unit 212 limits the rotational speed of the driving wheel so that the mobile robot 20 does not move at a speed equal to or higher than the upper limit value of the speed thereof.

The cost map 228 is a map on which costs added by the cost adding unit 218 are shown. Specifically, a cost is associated with a position (an address or coordinates) on the floor map 221. As described above, the cost map 228 may be a grid map in which a cost is recorded in each grid. Every time the cost adding unit 218 calculates a cost, the cost map 228 is updated.

The costs shown on the cost map 228 are transmitted to the host management apparatus 10 through the communication unit 23. That is, the communication unit 23 transmits the costs added by the cost adding unit 218 to the host management apparatus 10. Further, the communication unit 23 adds, in a cost, the ID of the mobile robot 20 which has added that cost, and transmits the cost(s) to the host management apparatus 10. In this way, the cost adding unit 118 of the host management apparatus 10 can integrate (i.e., combine) costs added by a plurality of mobile robots 20.

(Configuration of Mobile Robot 20)

Figure 3:
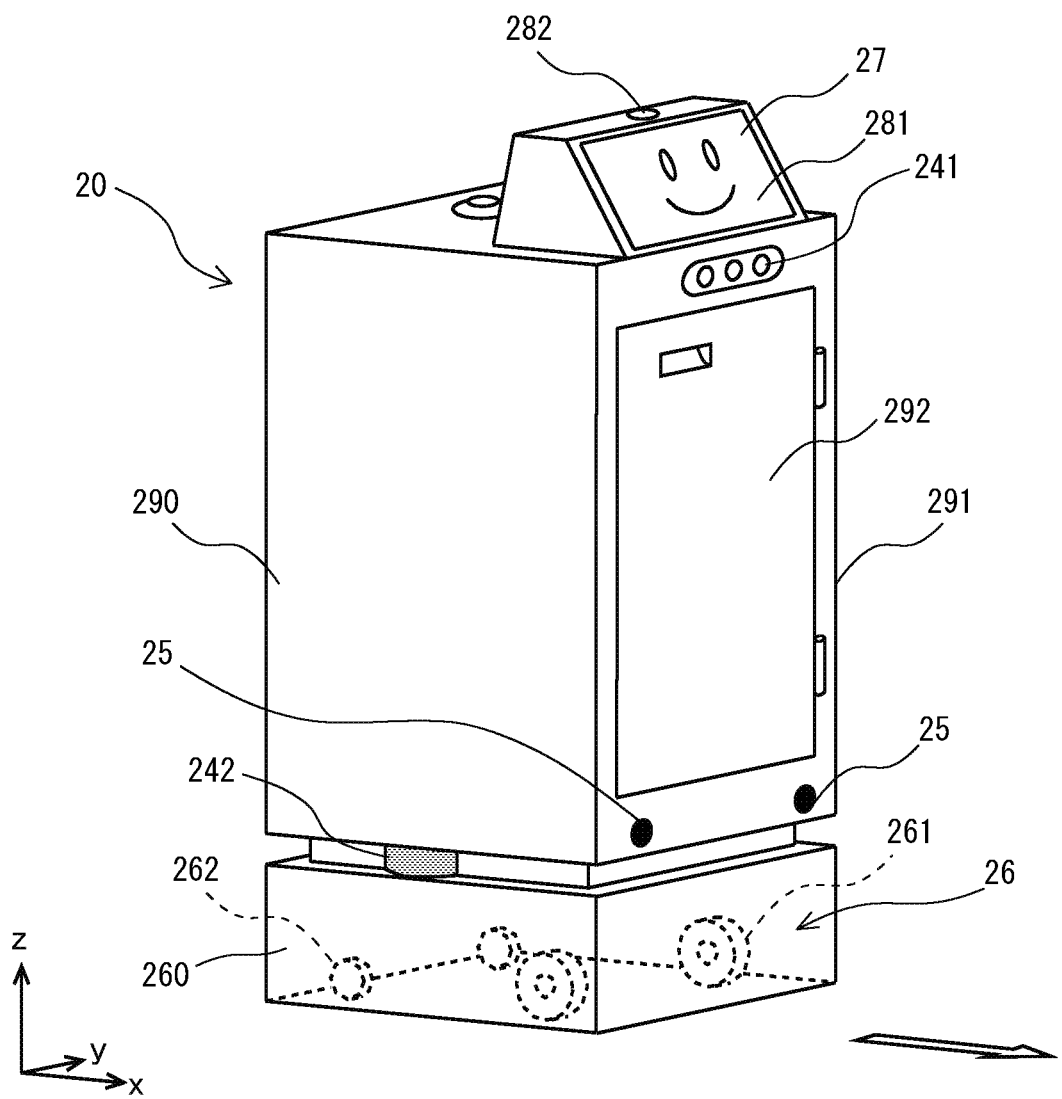
FIG. 3 is a schematic diagram showing an example of a mobile robot.

The external appearance of the mobile robot 20 will be described hereinafter. FIG. 3 shows a schematic diagram of the mobile robot 20. The mobile robot 20 shown in FIG. 3 is an example of the mobile robot 20, and the mobile robot 20 may have other shapes, appearances, and the like. Note that, in FIG. 3, the x-direction coincides with the forward/backward directions of the mobile robot 20, and the y-direction coincides with the left/right directions of the mobile robot 20. Further the z-direction is the height direction of the mobile robot 20.

The mobile robot 20 includes a body part 290 and a carriage part 260. The body part 290 is mounted on the carriage part 260. Each of the body part 290 and the carriage part 260 includes a rectangular parallelepiped housing, and various components are disposed in the housing. For example, the drive unit 26 is housed in the carriage part 260.

The body part 290 includes a storage box 291 that serves as a storage space, and a door 292 for hermetically close the storage box 291. The storage box 291 includes multi-stage shelves, and the availability state (i.e., the vacancy state) of each stage is managed. For example, the mobile robot 20 can update the available state of each stage by disposing various sensors such as a weight sensor in each stage. The mobile robot 20 autonomously moves and thereby conveys the goods stored in the storage box 291 to the destination indicated by the host management apparatus 10. A control box or the like (not shown) may be provided in the housing of the body part 290. Further, the door 292 may be configured so that it can be locked by an electronic key or the like. When the mobile robot 20 arrives at the conveyance destination, the user U2 unlocks the door 292 by the electronic key. Alternatively, when the mobile robot 20 arrives at the conveyance destination, the door 292 may be automatically unlocked.

As shown in FIG. 3, as the range sensor group 24, a front/rear range sensor 241 and a left/right range sensor 242 are provided on the exterior of the mobile robot 20. The mobile robot 20 measures a distance to a nearby object in the front/rear direction of the mobile robot 20 by the front/rear range sensor 241. Further, the mobile robot 20 measures a distance to the nearby object in the right/left direction of the mobile robot 20 by the left/right range sensor 242.

For example, a front/rear range sensor 241 is disposed on each of the front and rear surfaces of the housing of the body part 290. A left/right range sensor 242 is disposed on each of the left-side and right-side surfaces of the housing of the body part 290. Each of the front/rear range sensor 241 and the left/right range sensor 242 is, for example, an ultrasonic range sensor or a laser range finder. The distance to the nearby object is detected. When the distance to the nearby object detected by the front/rear range sensor 241 or the left/right range sensor 242 becomes equal to or shorter than the threshold distance, the mobile robot 20 decelerates or stops.

The drive unit 26 includes a driving wheel(s) 261 and a caster(s) 262. The driving wheel 261 is a wheel for moving the mobile robot 20 forward, backward, to the left, and to the right. The caster 262 is a driven wheel to which no driving force is supplied, and rolls so as to follow the driving wheel 261. The drive unit 26 includes a driving motor(s) (not shown) and drives the driving wheel(s) 261.

For example, the drive unit 26 supports, inside the housing, two driving wheels 261 and two casters 262 all of which are in contact with the surface on which the mobile robot travels. The two driving wheels 261 are arranged so that their rotational axes coincide with each other. Each of the driving wheels 261 is independently rotationally driven (i.e., independently rotated) by motors (not shown). The driving wheels 261 rotate according to control command values provided from the drive control unit 212 shown in FIG. 2. Each of the casters 262 is a trailing wheel, and is disposed in such a manner that its pivoting shaft rotatably supports its wheel at a point which is deviated from the rotating shaft of the driving wheel, and follows the driving wheels in the moving direction of the drive unit 26.

The mobile robot 20, for example, moves in a straight line when the two driving wheels 261 are rotated in the same direction at the same rotational speed, and turns around the vertical axis passing through substantially the center of the two driving wheels 261 when these wheels are rotated in the opposite direction at the same rotational speed. Further, the mobile robot 20 can move forward while turning left or right by rotating the two driving wheels 261 in the same direction at different rotational speeds. For example, the mobile robot 20 turns right by setting the rotational speed of the left driving wheel 261 higher than that of the right driving wheel 261. Conversely, the mobile robot 20 turns left by setting the rotational speed of the right driving wheel 261 higher than that of the left driving wheel 261. That is, the mobile robot 20 can move in a straight line, rotate on its own axis, or turn right or left in an arbitrary direction by individually controlling the rotational direction and the rotational speed of each of the two driving wheels 261.

Further, in the mobile robot 20, a display unit 27 and an operation interface 281 are provided on the upper surface of the body part 290. The operation interface 281 is displayed on the display unit 27. As a user touches the operation interface 281 displayed on the display unit 27, the operation receiving unit 28 can receive an instruction input from the user. Further, an emergency stop button 282 is provided on the upper surface of the display unit 27. The emergency stop button 282 and the operation interface 281 function as the operation receiving unit 28.

The display unit 27 is, for example, a liquid-crystal panel, and displays the face of a character (e.g., a mascot) in an illustration and/or presents (i.e., shows) information about the mobile robot 20 in text or using an icon. It is possible, by displaying the face of the character on the display unit 27, to give people in the area around the mobile robot 20 an impression that the display unit 27 is as if the face of the robot. The display unit 27 and the like provided in the mobile robot 20 can be used as the user terminal 400.

The camera 25 is disposed on the front surface of the body part 290. In this example, two cameras 25 function as stereo cameras. That is, the two cameras 25 having the same angle of view are horizontally arranged with an interval therebetween. The cameras 25 take images and output them as image data. It is possible to calculate the distance to the subject and the size thereof based on the image data of the two cameras 25. The arithmetic processing unit 21 can detect a person, an obstacle, or the like present ahead the mobile robot 20 in the moving direction by analyzing the images taken by the camera 25. When there is a person, an obstacle, or the like ahead the mobile robot 20 in the traveling direction, the mobile robot 20 moves along the route while avoiding it. Further, the image data of the camera 25 is transmitted to the host management apparatus 10.

The mobile robot 20 recognizes a nearby object and/or determines its own position by analyzing image data output from the camera 25 and detection signals output from the front/rear range sensor 241 and the left/right range sensor 242. The camera 25 photographs a scene (i.e., an area including objects, people, and the like) ahead of the mobile robot 20 in the traveling direction. As shown in the drawing, the side of the mobile robot 20 on which the camera 25 is disposed is defined as the front of the mobile robot 20. That is, when the mobile robot 20 is moving under normal circumstances, the forward direction of the mobile robot 20 is the traveling direction as indicated by an arrow.

Figure 4:
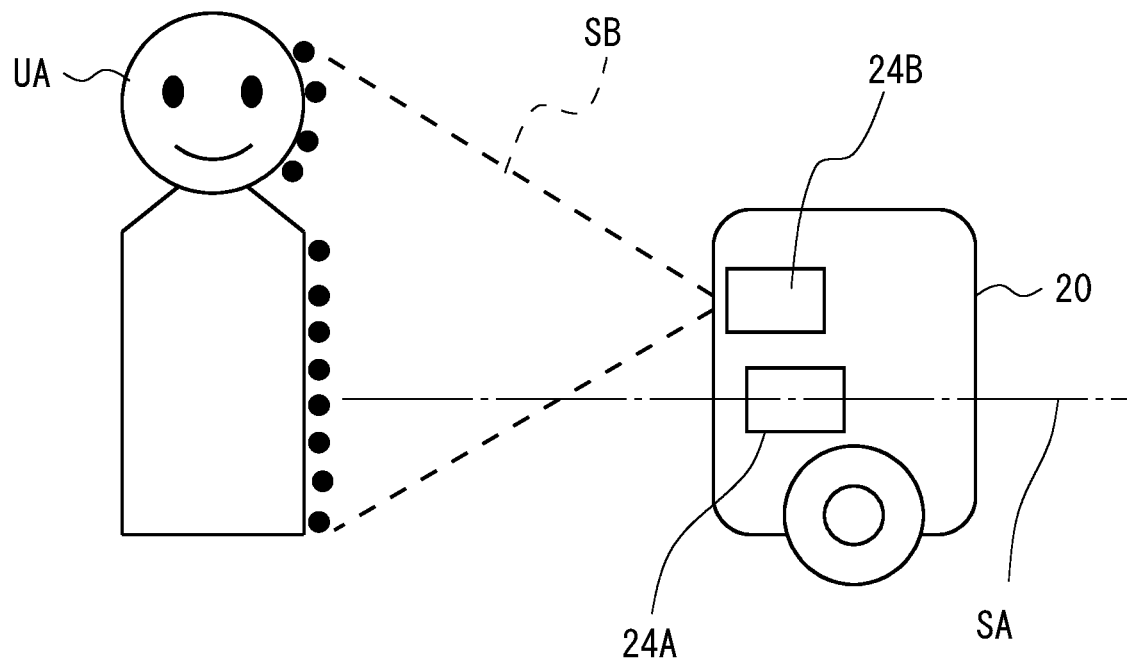
FIG. 4 is a schematic diagram for explaining a sensing area of a range sensor provided in a mobile robot.

Next, an example of the sensing area of the range sensor group 24 will be described. In this example, as shown in FIG. 4, two range sensors 24A and 24B are provided as the range sensor group 24. The range sensor 24A is a 2D (two-dimensional) range sensor, and the range sensor 24B is a 3D (three-dimensional) range sensor. The range sensors 24A and 24B may correspond to the front/rear range sensor 241 and the left/right range sensor 242, or may be provided separately from the front/rear range sensor 241 and the left/right range sensor 242. The range sensors 24A and 24B repeatedly measure a distance to a nearby object at predetermined time intervals. The range sensor 24A has a measurement range (i.e., a measurable distance) longer than that of the range sensor 24B.

Each of the range sensors 24A and 24B is a lidar (LiDAR: Light Detection and Ranging, Laser Imaging Detection and Ranging) which uses a pulsed laser beam as a measurement signal. Each of the range sensors 24A and 24B measures a distance to a nearby object based on the phase of the return light reflected on the nearby object and/or the round-trip time thereof. Each of the range sensors 24A and 24B has a scanning mirror for changing the emitting direction of the laser beam. As the range sensors 24A and 24B drive the scanning mirror, the measurement direction is changed.

The range sensor 24A is a 2D lidar, and its sensing area (its field angle range) SA is parallel to the horizontal plane. That is, in the range sensor 24A, since the scanning mirror rotates around the vertical axis, the measurement direction changes around the yaw axis. The emitting direction of the measurement signal is parallel to the horizontal plane, and the emitting direction of the measurement signal changes in the horizontal plane. Needless to say, the sensing area is not limited to those parallel to the horizontal plane. For example, when the floor surface is inclined, the sensing area SA may be parallel to the inclined surface. The sensing area SA extends in the left/right direction.

For example, the range sensor 24A performs 2D distance measurement by scanning all directions (360°) around the mobile robot 20 at intervals of 1°. The sensing area SA may include all directions of 360° in the horizontal plane, or may include only a range of angles, i.e., a part of 360°. For example, only a predetermined range of angles centered on the forward moving direction can be defined as the sensing area SA. The range sensor 24A may be used to estimate the position of the mobile robot 20 itself. For example, when there is a wall in the area around the mobile robot 20, information about this wall is recorded on the floor map 221. When the range sensor 24A measure a distance(s) to the wall(s), the arithmetic processing unit 21 estimates the current position of the mobile robot 20 by referring to the floor map 221. Further, the range sensor 24A may be used to detect an obstacle present in the area around the mobile robot 20.

The range sensor 24B is a 3D lidar, and its sensing area (its range of field angles) SB is three-dimensional. For example, in the range sensor 24B, the emitting direction of the measurement signal changes around the yaw axis and around the pitch axis. The range sensor 24B can acquire point group data indicating a 3D shape of a nearby object by scanning the 3D sensing area SB.

The mobile robot 20 measures a distance to a nearby object by using the range sensor 24B and the range sensor 24A, which perform 3D measurement and 2D measurement, respectively. For example, the maximum distance that the range sensor 24A can measure (i.e., the measurement range of the range sensor 24A) is longer the maximum distance that the range sensor 24B can measure (i.e., the measurement range of the range sensor 24B). That is, the range sensor 24A can measure a distance longer than that the range sensor 24B, which performs 3D measurement, can measure. In this case, it is possible to set the measurement range according to the intensity of the pulsed laser beam.

When a nearby object that is not present (i.e., not registered) on the floor map 221 is detected by the range sensor 24A, the range sensor 24B measures the 3D shape of that nearby object. For example, when the range sensor 24A detects a nearby object that is moving, the range sensor 24B measures the distance to this moving nearby object with high accuracy. In this way, it is possible to measure the 3D surface shape of the nearby object with high accuracy.

For example, in FIG. 4, the user UA is present as a nearby object ahead the mobile robot 20. The object detection unit 219 detects the user UA as a nearby object from the measurement result of the range sensor 24A, which can measure a long distance. The user UA is not registered on the floor map 221. Therefore, when the range sensor 24B has moved to a position where it can measure the distance to the user UA, the range sensor 24B performs measurement for the user UA. The range sensor 24B measures the user UA in such a manner that the user UA is included in the sensing area SB. The range sensor 24B measures the distance with high accuracy by reducing the pitch of the scanning angle of the measurement signal. Then the range sensor 24B measures the 3D shape of the surface of the nearby object. In this way, it is possible to measure point group data indicating the 3D shape of the user UA.

As described above, when the object detection unit 219 detects that there is a nearby object in the vicinity from the measurement result of the range sensor 24A, the range sensor 24B performs 3D measurement in such a manner that the nearby object is positioned at the center of the sensing area SB.

Further, the object detection unit 219 can calculate a movement vector of the nearby object from the measurement result of the range sensor 24B. When the nearby object is a moving person or another mobile robot 20, the object detection unit 219 estimates a movement vector of the person or the mobile robot 20. The movement vector is information including a moving speed and a moving direction. For example, the object detection unit 219 estimates the movement vector of the nearby object based on the change in the distance from the mobile robot 20 to the nearby object. The mobile robot 20 has already detected its own current position. Then, the object detection unit 219 detects the position of the nearby object on the floor map 221 according to the distance to the nearby object and the direction thereof. Then, the object detection unit 219 calculates the movement vector according to the change of the position of the nearby object over time on the floor map 221.

In FIG. 4, since the user UA is present in the area around the mobile robot 20, the object detection unit 219 detects the user UA as a nearby object. Note that the user UA is a staff member or a user of the facility. As described above, the object detection unit 219 detects the position of the user UA on the floor map 221. Further, the range sensors 24A and 24B repeatedly perform measurement. The object detection unit 219 estimates the movement vector of the user UA by comparing positions of the user UA on the floor map 221. Then, the cost adding unit 218 adds costs according to the movement vector of the user UA.

Further, the object detection unit 219 may estimate the position of the center of gravity of the nearby object, and estimate the movement vector thereof based on the change in the position of the center of gravity. For example, the object detection unit 219 calculates the position of the center of gravity of the nearby object based on the point group data. Note that the position of the center of gravity can be a position on the floor map 221, i.e., a 2D position on the horizontal plane. For example, when the position of the center of gravity of the points of the point group data is the position of the center of gravity of the nearby object, the object detection unit 219 may calculate the movement vector of the nearby object from the change in the position of the center of gravity thereof. For example, the object detection unit 219 calculates the movement vector of the nearby object by comparing the position of the center of gravity thereof obtained from the previous distance measurement result with that obtained from the latest distance measurement result on the floor map. By doing so, it is possible to improve the accuracy of the estimation of the moving speed and the moving direction.

Figure 5:
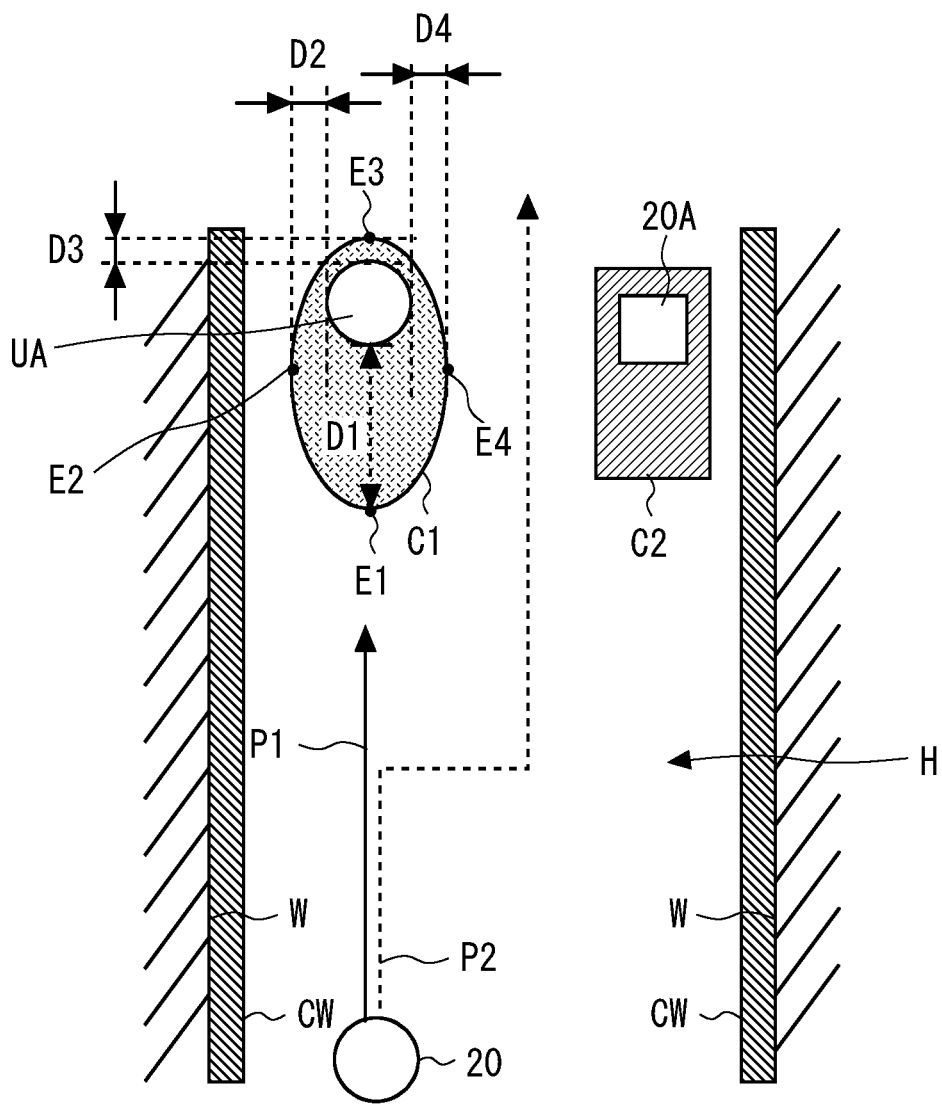
FIG. 5 is a diagram for explaining costs that are added according to a user UA which is a nearby object.

FIG. 5 is a schematic diagram for explaining costs added for the user UA and the mobile robot 20A present in the area around the mobile robot 20. FIG. 5 is a plan view schematically showing a mobile robot 20 traveling in a passage H and its surroundings. In the top view shown in FIG. 5, the mobile robot 20 travels along a passage H in the up/down direction (e.g., in the south/north direction). Walls W are provided on both the right and left sides of the passage H. That is, a space located between walls W is the passage H. In FIG. 5, the mobile robot 20 moves along the passage H from the bottom to the top thereof. Specifically, the mobile robot 20 moves on the passage H along a path P1 planned by the route planning unit 115. The path P1 is a route in which the robot 20 goes straight ahead along the passage in the passage direction.

In FIG. 5, the mobile robot 20 is moving upward. That is, the upper direction in FIG. 5 is the direction to the front of the mobile robot 20, and the lower direction is the direction to the rear of the mobile robot 20. Further, the mobile robot moves in the passage direction of the passage H. The vertical direction (up and down direction) in FIG. 5 is the passage direction, and the horizontal direction is the width direction of the passage H. The size of the passage H in the passage direction is larger than the size of the passage H in the width direction. The passage direction and the width direction may be registered in advance on the floor maps 221 and 121. That is, in the floor maps 221 and 121, information indicating the passage direction and the width direction may be registered for each passage.

Here, in front of the mobile robot 20, the user UA and the mobile robot 20A move along the passage H. The object detection unit 219 detects a user UA and a mobile robot 20A based on distance measurement results of distance measurement sensors 24A and 24B. Further, the mobile robot 20 estimates its own position on the floor map 221. Therefore, the object detection unit 219 can specify the positions of the user UA and the mobile robot 20A on the floor map 221. The object detection unit 219 detects the position of the nearby object based on the distance measurement results of the distance measurement sensors. The position of the nearby object detected by the object detection unit 219 is used as the detection position. The detection position is a position on the floor map 221. Here, the detection positions of the user UA and the mobile robot 20A are included in the passage H.

The object detection unit 219 may estimate the movement vector of the user UA and the mobile robot 20A. The movement vector indicates the moving speed and the moving direction of the nearby object. For example, the range sensors 24A and 24B repeatedly measure the distance to the user UA. That is, the range sensors 24A and 24B measure the distance to the user UA and the direction thereof with respect to the mobile robot 20. The object detection unit 219 specifies the position of the user UA on the floor map 221 with consideration given to the current own position of the mobile robot 20.

The object detection unit 219 estimates the moving direction of the user UA by comparing the position of the user UA obtained at the previous measurement with the position of the user UA obtained at the latest measurement. The object detection unit 219 calculates the distance between the position of the user UA obtained at the previous measurement and the position of the user UA obtained at the latest measurement. Then, the object detection unit 219 estimates the moving speed of the user UA from the measurement time interval of the range sensors 24A and 24B. For example, the measurement time interval is determined according to the scanning cycle of the lidar, the size of the sensing area, and the like. Needless to say, the estimation of the movement vector is not limited to the above-described method. For example, the object detection unit 219 may estimate the movement vector based on an average value of three or more measurement results of the range sensor.

The object detection unit 219 calculates the moving vector of the user A. That is, the object detection unit 219 calculates the moving vector of the user A based on the change of the position of the user A in the floor map 221. Here, the moving vector of the user A indicates the absolute moving speed and the moving direction of the user UA on the floor map 22. Similarly, the object detection unit 219 calculates the moving vector of the mobile robot 20A.

The cost adding unit 218 adds costs on the floor map 221 based on the detected position of the nearby object. The cost adding unit 218 calculates a cost in each grid on the floor map 221. The setting area to which the costs are added based on the position of the user A is defined as the setting area C1, and a setting area to which the costs are added based on the position of the mobile robot 20A is defined as the setting area C2. The setting area C1 is set to include the user UA and its periphery. The cost adding unit 218 sets the setting areas on a floor map 221 based on the position of the nearby object on the floor map 221. Here, the cost adding unit 218 sets the setting area for each nearby object.

The setting area C1 and the setting area C2 have a shape having a passage direction as a longitudinal direction. For example, the setting area C1 has an elliptical shape in which the passage direction is the major axis (the longitudinal direction) and the width direction is the minor axis (the minor direction). The setting area C2 is a rectangle having a long side along the passage direction and a short side along the width direction. The setting area C1 is set to include the user UA1 and its periphery. The setting area C2 is set to include the mobile robot 20A and its periphery.

When a person is detected as the nearby object, the setting area C1 is a fixed area set with the detection position of the person as a reference. When the mobile robot is detected as the nearby object, the setting area C2 is a fixed area set with the detection position of the mobile robot 20A as a reference. Of course, the setting area may have a shape other than an ellipse or a rectangle.

For example, the object detection unit 219 specifies the nearby object based on the point group data detected by the range sensor. The object detection unit 219 can specify whether the nearby object is a human or a mobile robot by performing pattern matching on the point group data. In the cost adding unit 218, a size and a planar shape are set in advance according to the type of nearby objects. The cost adding unit 218 sets the setting area having the size and shape corresponding to the nearby object at the detection position on a floor map 221. The cost adding unit 218 sets the setting area including the nearby object on the floor map 221.

The cost adding unit 218 adds costs in grids included in the setting areas C1 and C2. In this example, costs each of which has a fixed value are added in the grids included in the setting areas C1 and C2. Needless to say, the values of costs may be changed on a grid-by-grid basis according to the movement vector and the position. For example, the higher the moving speed is, the more the cost may be increased. Further, the closer a grid is to the user UA, the more the cost added to the grid may be increased or decreased. The cost adding unit 218 may determine the value of cost in accordance with the type of the nearby object. The cost may have a predetermined distribution within the setting areas C1 and C2.

Hereinafter, the setting area C1 for setting the cost to the user UA will be described in detail. In the following description, the longitudinal direction and the lateral direction will be described with reference to the moving direction of the mobile robot 20. For example, the forward direction is the moving direction of the mobile robot 20. Since the setting area C2 can be defined at the same way as that of the setting area C1, a description thereof will be omitted.

The end point on the rear side of the setting area C1 is defined as the end point E1, and the end point on the front side of the setting area C1 is defined as the end point E3. The end point on the left side of the setting area C1 is defined as the end point E2, and the end point on the right side of the setting area C1 is defined as the end point E4. The setting area C1 has an elliptical shape passing through the end points E1 to E4.

In the longitudinal direction, the distance from the user UA to the end point E1 is defined as a distance D1, and the distance from the user UA to the end point E3 is defined as a distance D3. A point separated from the nearby object by a distance D1 in the passage direction is an end point E1. A point separated from the nearby object by a distance D3 in the passage direction is an end point E3.

The distance from the user UA to the end point E2 in the left-right direction is defined as the distance D2, and the distance from the user UA1 to the end point E4 is defined as the distance D4. A point separated from the nearby object by a distance D2 in the width direction is the end point E2. A point separated from the nearby object by a distance D4 in the width direction is the end point E4. The distance D1 is longer than the distance D2 to the distance D4. That is, the end points E1 to E4 are set so that the distance D1 on the rear side of the mobile robot 20 in the passage direction becomes the longest of the distances D1 to D4.

Although the surface position of the nearby object is set as the starting point of the distance D1 to the distance D4, the center of gravity position of the nearby object may instead be set as the starting point. In this case, the starting points of the distance D1 to the distance D4 are the same. Therefore, the sum of the distance D1 and the distance D3 becomes the size of the setting area C1 in the passage direction. The sum of the distance D2 and the distance D4 becomes the size of the setting area C1 in the width direction.

The size of the setting area C1 in the longitudinal direction is defined by the distance from the end point E1 to the end point E3 in the longitudinal direction. The size of the setting area C1 in the left-right direction is defined by the distance from the end point E2 to the end point E4 in the left-right direction. As described above, in the setting area C1, the passage direction is the longitudinal direction. Therefore, the distance from the end point E1 to the end point E3 in the longitudinal direction is longer than the distance from the end point E2 to the end point E4 in the lateral direction.

The cost adding unit 218 sets the setting area according to the detection position of the nearby object and adds the costs to the setting area. Thus, the mobile robot 20 can be moved efficiently. For example, the mobile robot 20 moves along a path P2 that avoids the setting area C1 and the setting area C2. Therefore, the mobile robot 20 can move without decreasing the moving speed.

Normally, in the passage H, the user UA and the mobile robot 20A often move in the passage direction. In other words, since the width of the passage H is limited, the user UA or the mobile robot 20A rarely moves in the width direction of the passage H. The cost adding unit 218 sets the setting area C1 in which the distance D1 to the end point E1 is made longer than the distance D2 to the end point E2 and the distance D3 to the end point E3. The cost adding unit 218 adds costs to the setting area C1.

Thus, the mobile robot 20 can move so as to avoid moving destinations of the user UA and the mobile robot 20A. Thus, the mobile robot 20 can move along the passage H without decelerating or stopping. In a situation in which the nearby object is moving, the mobile robot 20 can efficiently move along the passage H. In some embodiments, the setting area C1 has a shape in which the passage direction is the longitudinal direction (long side direction) and the width direction is the transverse direction (short side direction). In some embodiments, the distance D1 from the nearby object to the end point E1 on the rear side of the mobile robot 20 in the passage direction may be the longest among the distances D1 to D4. The rear side of the mobile robot 20 in the passage direction is a side where the mobile robot 20 approaches the nearby object. Thus, the cost can be added to the appropriate setting area.

The cost adding unit 218 calculates the cost based on the detection position obtained for each distance measurement and successively adds the calculated cost. When the nearby object is moving, the detection position of the nearby object also changes for each distance measurement. Therefore, the positions of the setting areas C1 and C2 also change with each distance measurement. The costs are updated according to the measurement results of the distance measuring sensors 24A, 24B. In the grids included in the cost areas C1 and C2, the costs are added. That is, the costs increase in grids included in the setting areas C1 and C2. Further, each of the costs in all the grids is subtracted by a fixed value at each measurement. Therefore, the costs in grids outside of the setting areas C1 and C2 over time. That is, in grids located outside of the setting areas C1 and C2, the costs decrease at each distance measurement. Costs to be added (i.e., costs to be increased) and costs to be decreased may be determined according to the cost setting range, the measurement time interval, the movement vector, and the like. As described above, the cost adding unit 218 adds costs at each measurement, so that the cost map is updated successively (e.g., at each measurement).

Then, the mobile robot 20 moves according to the cost map 228. The mobile robot 20 moves along such the path P2 that the mobile robot 20 passes through grids having low costs. In FIG. 5, since costs around the user UA and the mobile robot 20A are high, the mobile robot 20 moves along the path P2 that passes (i.e., extends) so as to avoid the area located ahead of the user UA and the mobile robot 20A in the moving direction. For example, a path P2 that passes (i.e., extends) through grids in which the costs are equal to or lower than a predetermined value on the cost map is set. The path P2 is set so as to pass between the setting area C1 and the setting area C2. The mobile robot 20 takes the cost map 228 into consideration in the route planning.

In this way, the mobile robot 20 can move efficiently. The mobile robot 20 can perform route planning while predicting the place to which the user UA and the mobile robot 20A will move. That is, since the mobile robot 20 can move through the path P2 that avoids the place to which the user UA will move, the mobile robot 20 can move without reducing its moving speed. The traveling time required to travel to the destination can be reduced. It is desired that the mobile robot 20 that is used in an environment where there are people moves while avoiding them. When control is performed so as to avoid people, it is difficult to increase the moving speed. By setting the setting area and updating costs as described in this embodiment, it is possible to predict the position of a person. Therefore, the mobile robot 20 can move efficiently.

The arithmetic processing unit 21 performs control so that the mobile robot 20 moves according to the costs that are updated according to the measurement results of the range sensors 24A and 24B. For example, the arithmetic processing unit 21 may re-plan the route based on the cost map 228. That is, in the passage in which the mobile robot 20 is moving, the mobile robot 20 performs route planning so that the mobile robot 20 passes through grids having low costs. When the cost in at least one of the grids included in the path P1 exceeds predetermined value, the arithmetic processing unit 21 corrects the straight path P1 and sets a new path P2.

Note that, in FIG. 5, wall cost areas CW are set near the walls W. The wall cost area CW is an area within a predetermined distance from the wall W, and is disposed (i.e., extends) along the wall W. The costs in the wall cost area CW are fixed. That is, fixed wall costs are set in the wall cost area CW. In this case, the costs do not change over time near the wall W. That is, even when the measurement result of the range sensor is updated, the costs in the wall cost area CW are unchanged from the fixed value. Therefore, a route is planned in such a manner that the mobile robot 20 does not run near (i.e., does not collide with) the wall W. By adding (i.e., by keeping) costs in grids near the walls W and the like at a continuous manner, it is possible to prevent the mobile robot 20 from colliding with or moving close to the wall W. Therefore, the mobile robot 20 can move more efficiently. For example, it is possible to set the above-described threshold distance to a large value.

A plurality of mobile robots 20 may add costs on their respective floor maps 221. That is, each of the mobile robots 20 adds costs based on the measurement result of the range sensors 24A and 24B provided in that mobile robot 20.

Then, the plurality of mobile robots 20 may share the floor maps or the cost maps. For example, the range sensors 24A and 24B of one of the mobile robots 20 can measure a blind area of the range sensors 24A and 24B of another mobile robot 20. Therefore, the one of the mobile robots 20 can add costs in the blind are of the other mobile robot 20. The mobile robot 20 transmits its own cost map to the host management apparatus 10.

Then, the host management apparatus 10 adds the costs on the cost maps 228 of the plurality of mobile robots 20, and thereby generates a cost map 128 to be shared by the plurality of mobile robots 20. The host management apparatus 10 transmits the costs on the cost map 128 to be shared to each of the mobile robots 20. In this case, the host management apparatus 10 may transmit only costs added in a partial area on the cost map 128. That is, the host management apparatus 10 transmits, to the mobile robot 20, costs added in a blind area located ahead of the mobile robot 20 in the moving direction. By doing so, costs are also added in the blind area of the range sensors 24A and 24B of the mobile robot 20. Therefore, since the mobile robot 20 can predict a situation in the blind area, the mobile robot 20 can plan a route by which it can move more efficiently.

Note that although the above description with reference to FIG. 5 has been given on the assumption that the nearby object is the user UA, i.e., a person, the nearby object is not limited to people and may be another mobile robot 20. Alternatively, the nearby object may be a conveyance cart or a wheelchair. When there is a nearby object that is moving (such as a person or another mobile robot) in the area around the mobile robot 20, the mobile robot 20 moves based on costs added to the setting area.

Further, in this embodiment, a distance to a nearby object is measured by using the range sensors 24A and 24B, which perform 2D and 3D measurements, respectively. Further, the maximum distance that the range sensor 24A, which performs 2D measurement, can measure (i.e., the measurement range of the range sensor 24A) is longer the maximum distance that the range sensor 24B can measure (i.e., the measurement range of the range sensor 24B). That is, the range sensor 24A can measure a distance longer than that the range sensor 24B, which performs 3D measurement, can measure. In this way, it is possible to improve the accuracy of the estimation of the movement vector of a nearby object.

Further, the object detection unit 219 may estimate the position of the center of gravity of a nearby object from the measurement result of the range sensor 24B. Then, the object detection unit 219 may calculate the movement vector from the change of the position of the center of gravity of the nearby object over time. By doing so, it is possible to improve the accuracy of the estimation of the moving speed and the moving direction. The plurality of mobile robots 20 may share the floor maps or the cost maps. For example, the range sensors 24A and 24B of one of the mobile robots 20 can measure a blind area of the range sensors 24A and 24B of another mobile robot 20. Therefore, the one of the mobile robots 20 can add costs in the blind are of the other mobile robot 20. The mobile robot 20 transmits its own cost map to the host management apparatus 10.

The cost adding unit 218 may add costs according to the moving direction or moving speed of the nearby object. For example, the object detection unit 219 estimates that the user UA is moving along the passage H toward the mobile robot 20. That is, the user UA is moving downward in FIG. 5. In this case, the distance D3 to the end point E3 on the rear side of the moving direction is made shorter than the distance D1. That is, since the possibility of interference with nearby object is low on the side far from the mobile robot 20, the distance D3 is shortened to reduce the setting area C1. The end point E3 may be set so that the distance D3 is shorter than the distances D2 and D4.

Further, the cost adding unit 218 can change the size of the setting area in accordance with the moving speed of the nearby object. For example, the higher the moving speed of the nearby object, the larger the setting area that may be set by the cost adding unit 218. The cost adding unit 218 may deform or rotate the setting area in accordance with the moving direction. For example, the setting area may be set so that the longitudinal direction of the setting area is parallel to the moving direction.

Figure 6:
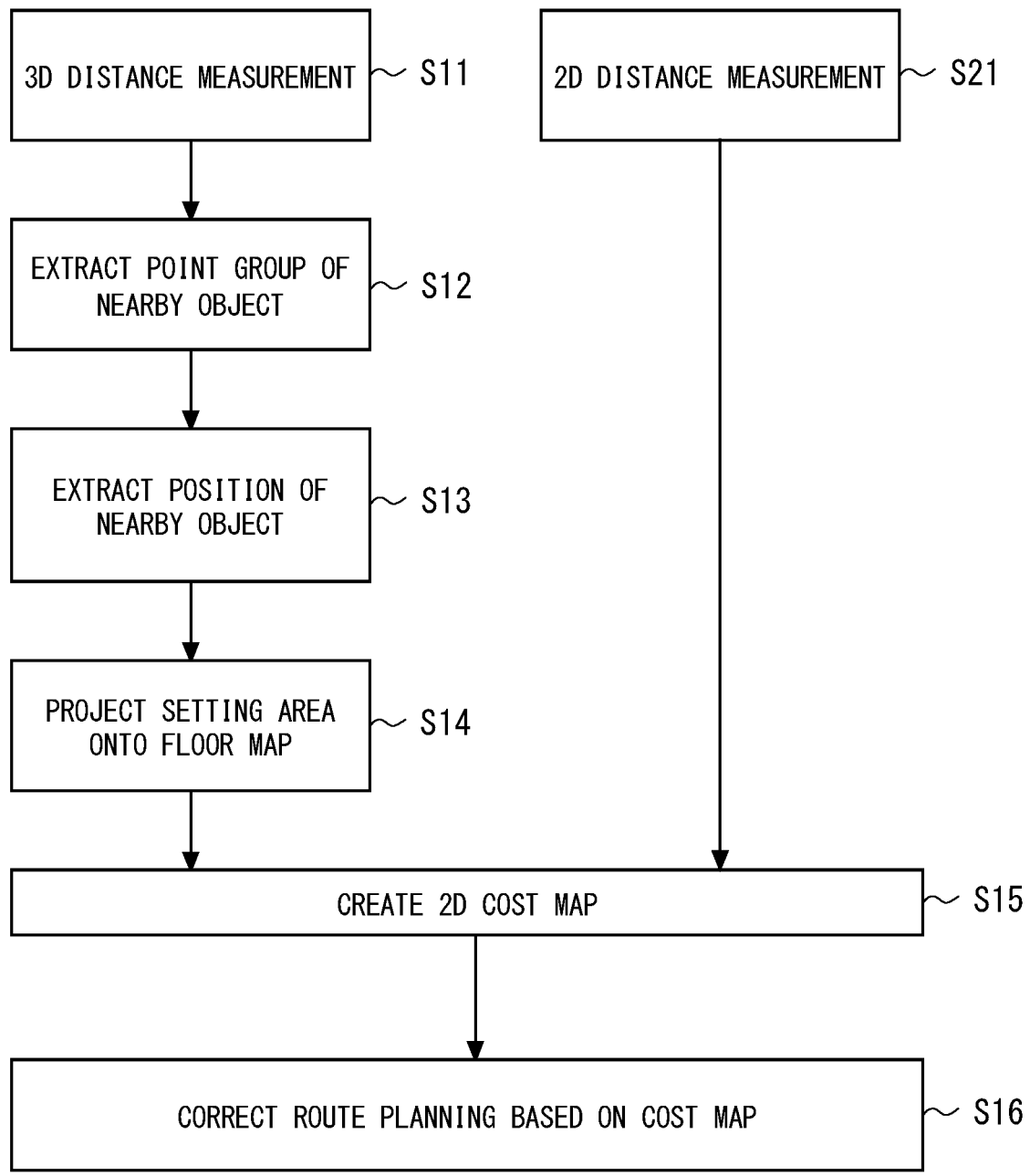
FIG. 6 is a flowchart showing a control method according to an embodiment.

A control method according to this embodiment will be described with reference to FIG. 6. FIG. 6 is a flowchart showing a control method. Firstly, the range sensors 24A and 24B perform 2D distant measurement and 3D distant measurement, respectively (S11 and S21). Then, the object detection unit 219 extracts a point group of the nearby object (S12). In this way, the object detection unit 219 can acquire point group data indicating the 3D shape of the nearby object.

Next, the object detection unit 219 detects the position of the nearby object (S13). The object detection unit 219 detects the position of the nearby object in the floor map 221. Note that the object detection unit 219 may calculate the moving vector based on the change of the position of the nearby object. Then, the object detection unit 219 projects the setting area set to the detection position onto the 2D floor map 221 (S14). In this case, the position and the like of the nearby object are projected onto the floor map 221.

The cost adding unit 218 determines whether or not the detection position of the nearby object is in a passage on the floor map 221. For example, information indicating the position and range of the passage is registered in the floor map 221. When the detection position of the nearby object is in the passage, the cost adding unit 218 sets the setting area passing through the above-mentioned end points E1 to E4. For example, in the passage, an elliptical or rectangular setting area is set. The cost adding unit 218 predicts the passage direction as the moving direction of the nearby object, and sets the setting area in which the size in the passage direction is larger than the size in the width direction. When the detection position of the nearby object is not on the passage, the cost adding unit 218 extracts an isotropic setting area. For example, in a place outside of the passage, the setting area of a circle or a square is set. The object detection unit 219 may determine the moving speed and the moving direction of the nearby object. The cost adding unit 218 may change the size and shape of the setting area according to the moving speed and the moving direction.

The information indicating whether each position on the floor map 221 is a passage or not is registered at each position (coordinate). Therefore, the cost adding unit 218 can determine whether the detection position of the nearby object is in the passage or not. For example, in a place other than the passage, that is, a waiting room, an elevator hall or the like, since the moving direction of a person cannot be predicted, the cost adding unit 218 sets a circular setting area. The object detection unit 219 may determine the moving speed and the moving direction of the nearby object. The cost adding unit 218 may change the size and shape of the setting area in accordance with the moving speed and the moving direction.

The cost adding unit 218 generates the 2D cost map 228 by adding costs on the setting area (S15). In this process, the mobile robot 20 estimates the position of the mobile robot 20 itself based on the 2D distance measurement result of the range sensor 24A. That is, the arithmetic processing unit 21 can estimate the position of the mobile robot 20 itself with high accuracy by comparing the distance measurement result of the range sensor 24A with the floor map 221. Then, the cost adding unit 218 projects the costs of the nearby object onto the map by using the estimated position of the mobile robot 20 itself as the reference position. That is, the cost map is projected onto the map which has compared with (i.e., has been checked by using) the 2D distance measurement result.

Then, the arithmetic processing unit 21 corrects the route plan based on the cost map (S16). For example, if the mobile robot 20 is supposed to pass through a place where the cost exceeds a predetermined value in the original route, the route is changed. That is, the route is corrected so that the mobile robot 20 will bypass the place where the cost is high. In this way, the mobile robot 20 can move efficiently. Further, the route planning unit 115 or the mobile robot 20 creates a moving plan based on the distance measurement results of the range sensors 24A and 24B. Accordingly, the mobile robot 20 can move more efficiently. Then, the mobile robot 20 moves along the corrected route.

Figure 7:
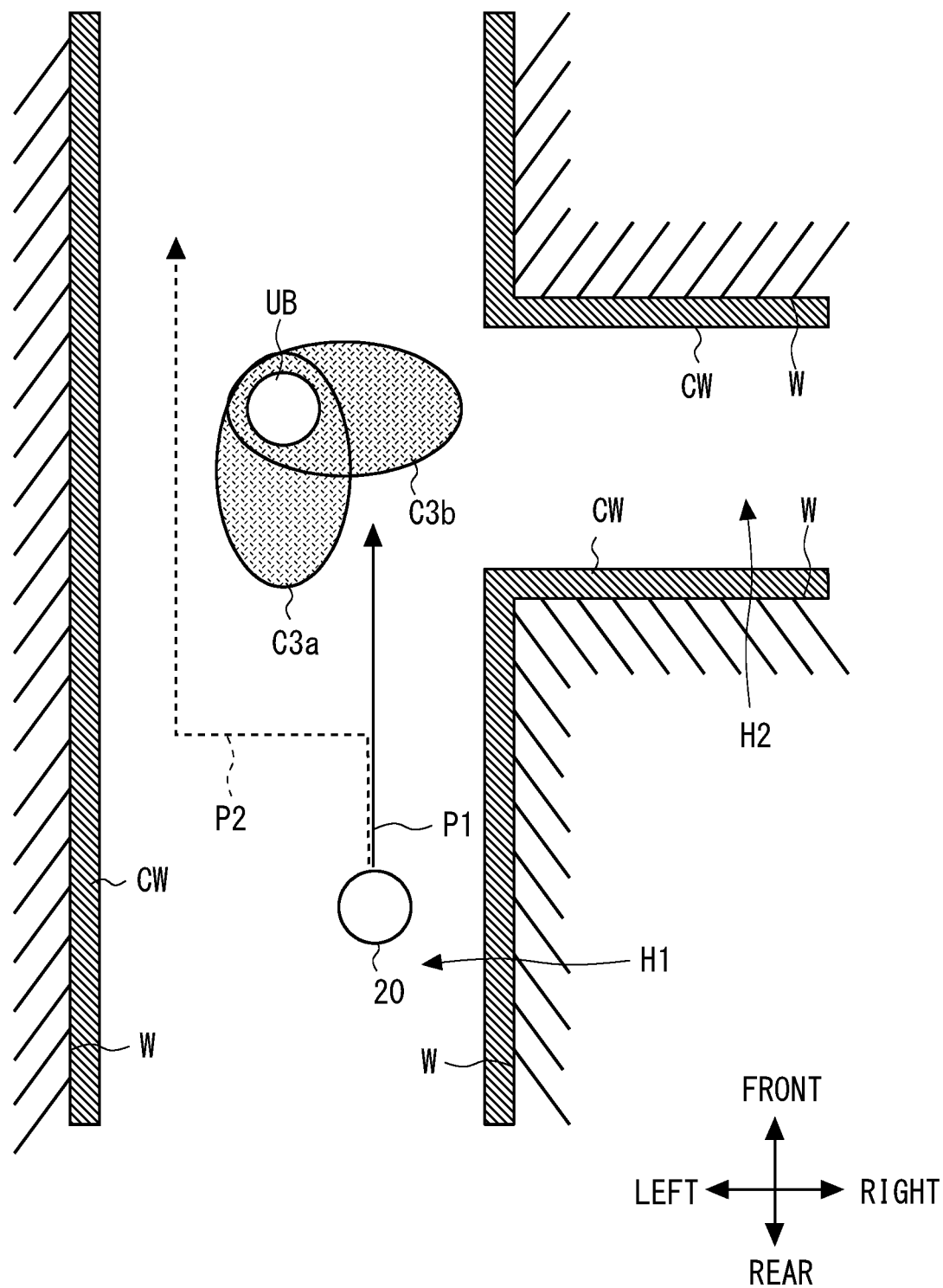
FIG. 7 is a schematic diagram showing a map which indicates a setting area when a user UB is detected around an intersection.

FIG. 7 is a diagram showing an example of a setting area. FIG. 7 is a map diagram showing a three-way intersection where the passage H1 and the passage H2 intersect. The passage H1 has a passage direction in the vertical direction, and the passage H2 has a passage direction in the horizontal direction. The mobile robot 20 moves along the passage H1 from the bottom to the top in FIG. 7. Although the passage H1 and the passage H2 are orthogonal, they may not be orthogonal. That is, the passage H1 and the passage H2 need not be parallel and may intersect at any angle.

A user UB is in front of the mobile robot 20. The user UB is present at the intersection of the passage H1 and the passage H2. In this case, the cost adding unit 218 sets the setting area C3a and the setting area C3b to the detection position of the user UB. Like the setting area C1, the setting area C3a has an elliptical shape whose longitudinal direction (the major axis direction) is the front-back direction. The setting area C3b has an elliptical shape whose longitudinal direction (the major axis direction) is the passage direction of the passage H2 (the left-right direction in FIG. 7). Therefore, the longitudinal direction of the setting area C3a and the longitudinal direction of the setting area C3b are orthogonal to each other.

Thus, in the vicinity of the intersection, the setting area can be expanded in accordance with the direction in which the passage extends. Specifically, since the passage H2 extends from the passage H1 in the right direction, the distance from the user UB to the end point in the right direction in the setting area C3b is long. Thus, the cost adding unit 218 can add the cost more appropriately. That is, the user UB is likely to move not only in the front-back direction but also in the right direction. Therefore, the cost adding unit 218 adds the costs to the setting area C3a extending in the right direction.

That is, when the passage H2 extending in the right and left directions joins with the passage H1 extending in the traveling direction of the mobile robot 20, the costs are added to the setting area C3b extending in the right-left direction. That is, the cost adding unit 218 adds the costs to the grid included in the setting area C3a or the setting area C3b. Thus, the mobile robot 20 can move more appropriately.

For example, in FIG. 7, the path P1 travelling on the right side of the passage H1 is set, but the mobile robot 20 corrects the path P1 to the path P2 based on the cost map. The re-planned path P2 passes through the left side of the user UB. That is, the mobile robot 20 moves along the path P2 passing between the user UB and the left wall W1. Since there is a possibility that the user UB moves rightward, the mobile robot 20 passes the left side of the user UB and passes through the passage H1. Thus, the mobile robot 20 can move without reducing its speed.

For example, in the floor maps 221 and 121, information indicating intersections such as three-way intersections, four-way intersection (crossroads), and five-way intersection is registered. The floor maps 221 and 121 include position information indicating the position of the intersection. Further, in the floor maps 221 and 121, each intersection is registered with a passage direction of each passage. For example, in FIG. 7, information indicating that the passage H1 is a passage extending in the north-south direction and the passage H2 is a passage extending in the easterly direction with the center of the intersection as a base point is registered. Of course, the angle between the 2 passage directions is not limited to 90 degrees.

The cost adding unit 218 refers to the floor map 221 and determines whether or not the detection position of the nearby object is included in the intersection. When the detection position is in an intersection, the cost adding unit 218 sets a setting area extending in each passage direction. The cost adding unit 218 adds the costs to the setting area. Thus, the cost adding unit 218 can add appropriate costs. The mobile robot 20 moves by referring to a cost map 228 based on the updated cost. Thus, the mobile robot 20 can move around the intersection without reducing its speed. Therefore, the mobile robot 20 can efficiently move.

In the above description, the costs are used as restriction information for restricting the movement of the mobile robot 20, but the restriction information is not limited to costs. For example, the upper limit speed of the mobile robot 20 can be used as the limit information. That is, when the mobile robot 20 enters the setting area, the robot control system may control the mobile robot 20 so as to reduce the upper limit speed. For example, the upper limit speed (speed limit) is 5 km/h in the areas other than the setting area, and the upper limit speed is 2 km/h in the setting area. When the mobile robot 20 enters the setting area around the nearby object, the control system reduces the speed from 5 km/h to 2 km/h. Thus, the mobile robot 20 can move without contacting the nearby object. In addition, since the upper limit speed can be set high outside the periphery of the nearby object, the mobile robot 20 can move at a high speed. Thus, the mobile robot 20 can efficiently move.

Alternatively, the limit information is not limited to information indicating the upper limit speed, and may instead be information for temporarily stopping the mobile robot 20. That is, when the mobile robot 20 enters the setting area, the robot control system temporarily stops the mobile robot. Then, the mobile robot 20 may be moved after stopping once. In this case, the mobile robot 20 can move at a low speed, so that it is possible to move more safely.

The control method according to this embodiment may be performed by the mobile robot 20 in a standalone manner or by the host management apparatus 10. Further, the mobile robot 20 and the host management apparatus 10 may perform the robot control method in corporation with each other. That is, the robot control system according to this embodiment may be installed in the mobile robot 20. Alternatively, at least a part or the whole robot control system may be installed in an apparatus other than the mobile robot 20, e.g., in the host management apparatus 10.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described embodiments, and they may be modified as appropriate without departing from the scope and spirit of the disclosure. For example, although a system in which a conveyance robot autonomously moves in a hospital has been described in the above-described embodiments, the above-described system also makes it possible to convey certain articles as luggage in a hotel, a restaurant, an office building, an event venue, or a complex facility.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A robot control system configured to control a mobile robot configured to autonomously move along a first passage in a first passage direction by referring to a map, the robot control system being further configured to:
   repeatedly acquire a distance to a nearby object measured by using a range sensor;
   specify a detection position of the nearby object on the map according to the distance from a position of the mobile robot to the nearby object;
   set a first setting area including the detection position onto the map, wherein the first setting area has a first end separated from the detection position by a first distance in the first passage direction of the first passage and a second end separated from the detection position by a second distance in a first width direction of the first passage, and wherein the second distance is shorter than the first distance;
   add a cost as a restriction information for restricting a movement of the mobile robot to the first setting area on the map; and
   perform control so that the mobile robot moves along a route according to the restriction information,
   wherein the first setting area has a shape in which the first passage direction is a long side direction and the first width direction is a short side direction,
   the robot control system is configured to calculate and update the cost by sequentially adding a value in grids on the map in accordance with a detection result of the range sensor,
   the robot control system is configured to estimate a moving direction of the nearby object in the first passage direction based on a change of the distance to the nearby object,
   the first setting area has the first end and a third end,
   the first end is set as a point separated from the detection position by the first distance in a forward side in the moving direction,
   the third end is set as a point separated from the detection position by a third distance in a backward direction in the moving direction, wherein the third distance is shorter than the first distance,
   the map includes a second passage in a second passage direction, wherein the second direction is different from the first direction,
   an intersection in which the first passage joins the second passage is registered on the map,
   the robot control system is configured to set a second setting area based on the detection position when the detection position is present at the intersection,
   the second setting area has a shape in which the second passage direction is a long side direction and a second width direction of the second passage is a short side direction,
   the robot control system is configured to add the cost to the second setting area on the map,
   the first setting area and the second setting area are fixed areas set with detection position as a reference,
   sizes and planar shapes of the first setting area and the second setting area are set according to a type of the nearby object, and
   when the detection position is specified, the cost is updated so that the cost is increased in the first setting area or the second setting area and the cost is decreased outside of the first setting area or the second setting area.

2. The robot control system according to claim 1, wherein the range sensor comprises a three-dimensional range sensor and a two-dimensional range sensor, the two-dimensional range sensor being able to measure a distance longer than a distance the three-dimensional range sensor can measure.

3. The robot control system according to claim 1, wherein the nearby object is a person or another mobile robot present in an area around the mobile robot, and
   wherein a planar shape of the first setting area when the nearby object is human being is different from the planar shape of the first setting area when the nearby object is mobile robot.

4. The robot control system according to claim 1, wherein in the first setting area or the second setting area,
   a fixed cost is added or the closer to the nearby object, more the cost is added in the grids, and
   a higher moving speed is, more the cost is added.

5. The robot control system according to claim 1, wherein the intersection is a three-way intersection,
   the second setting area has a fourth end and fifth end,
   the fourth end is set as a point separated from the detection position by the fourth distance in an extending direction,
   the fifth end is set as a point separated from the detection position by a fifth distance in a direction opposite to the extending direction, and
   in a planar view, the extending direction is a direction extending from the first passage to the second passage.

6. The robot control system according to claim 1, wherein the first setting area and the second setting area are fixed area having an elliptical shape or rectangular shape.

7. A robot control method comprising controlling a mobile robot configured to autonomously move along a first passage in a first passage direction by referring to a map, the robot control method further comprising:
   repeatedly acquiring a distance to a nearby object measured by using a range sensor;
   specifying a detection position of the nearby object on the map according to the distance from a position of the mobile robot to the nearby object;
   set a first setting area including the detection positon onto the map, wherein the first setting area has a first end separated from the detection positon by a first distance in the first passage direction of the first passage and a second end separated from the detection positon by a second distance in a first width direction of the first passage, and wherein the second distance is shorter than the first distance;

adding a cost as a restriction information for restricting a movement of the mobile robot to the first setting area on the map; and performing control so that the mobile robot moves along a route according to the restriction information, wherein the first setting area has a shape in which the first passage direction is a long side direction and the first width direction is a short side direction, calculating and updating the cost by sequentially adding a value in grids on the map in accordance with a detection result of the range sensor, estimating a moving direction of the nearby object in the first passage direction based on a change of the distance to the nearby object, the first setting area has the first end and a third end, the first end is set as a point separated from the detection position by the first distance in a forward side in the moving direction, the third end is set as a point separated from the detection position by a third distance in a backward direction in the moving direction, wherein the third distance is shorter than the first distance, the map includes a second passage in a second passage direction, wherein the second direction is different from the first direction, an intersection in which the first passage joins the second passage is registered on the map, setting a second setting area based on the detection position when the detection position is present at the intersection, the second setting area has a shape in which the second passage direction is a long side direction and a second width direction of the second passage is a short side direction, adding the cost to the second setting area on the map, the first setting area and the second setting area are fixed areas set with detection position as a reference, sizes and planar shapes of the first setting area and the second setting area are set according to a type of the nearby object, and when the detection position is specified, updating the cost so that the cost is increased in the first setting area or the second setting area and the cost is decreased outside of the first setting area or the second setting area.

8. The robot control method according to claim 7, wherein the range sensor comprises a three-dimensional range sensor and a two-dimensional range sensor, the two-dimensional range sensor being able to measure a distance longer than a distance the three-dimensional range sensor can measure.

9. The robot control method according to claim 7, wherein the nearby object is a person or another mobile robot present in an area around the mobile robot, and wherein a planar shape of the first setting area when the nearby object is human being is different from the planar shape of the first setting area when the nearby object is mobile robot.

10. The robot control method according to claim 7, wherein in the first setting area or the second setting area, adding a fixed cost or the closer to the nearby object, more the cost is added in the grids, and a higher moving speed is, more the cost is added.

11. The robot control method according to claim 7, wherein the intersection is a three-way intersection, the second setting area has a fourth end and fifth end, the fourth end is set as a point separated from the detection position by the fourth distance in an extending direction, the fifth end is set as a point separated from the detection position by a fifth distance in a direction opposite to the extending direction, and in a planar view, the extending direction is a direction extending from the first passage to the second passage.

12. The robot control method according to claim 7, wherein the first setting area and the second setting area are fixed area having an elliptical shape or rectangular shape.

13. A non-transitory computer readable medium storing a program for causing a computer to perform a robot control method comprising controlling a mobile robot configured to autonomously move along a first passage in a first passage direction by referring to a map, the robot control method further comprising:

repeatedly acquiring a distance to a nearby object measured by using a range sensor;

specifying a detection position of the nearby object on the map according to the distance from a position of the mobile robot to the nearby object;

setting a first setting area including the detection positon onto the map, wherein the first setting area has a first end separated from the detection positon by a first distance in the first passage direction of the first passage and a second end separated from the detection positon by a second distance in a first width direction of the first passage, and wherein the second distance is shorter than the first distance;

adding a cost as a restriction information for restricting a movement of the mobile robot to the first setting area on the map; and performing control so that the mobile robot moves along a route according to the restriction information, wherein the first setting area has a shape in which the first passage direction is a long side direction and the first width direction is a short side direction, calculating and updating the cost by sequentially adding a value in grids on the map in accordance with a detection result of the range sensor, estimating a moving direction of the nearby object in the first passage direction based on a change of the distance to the nearby object, the first setting area has the first end and a third end, the first end is set as a point separated from the detection position by the first distance in a forward side in the moving direction, the third end is set as a point separated from the detection position by a third distance in a backward direction in the moving direction, wherein the third distance is shorter than the first distance, the map includes a second passage in a second passage direction, wherein the second direction is different from the first direction, an intersection in which the first passage joins the second passage is registered on the map, setting a second setting area based on the detection position when the detection position is present at the intersection, the second setting area has a shape in which the second passage direction is a long side direction and a second width direction of the second passage is a short side direction, adding the cost to the second setting area on the map, the first setting area and the second setting area are fixed areas set with detection position as a reference, sizes and planar shapes of the first setting area and the second setting area are set according to a type of the nearby object, and when the detection position is specified, updating the cost so that the cost is increased in the first setting area or the second setting area and the cost is decreased outside of the first setting area or the second setting area.

14. The non-transitory computer readable medium according to claim 13 wherein the range sensor comprises a three-dimensional range sensor and a two-dimensional range sensor, the two-dimensional range sensor being able to measure a distance longer than a distance the three-dimensional range sensor can measure.

15. The non-transitory computer readable medium according to claim 13, wherein the nearby object is a person or another mobile robot present in an area around the mobile robot, and wherein a planar shape of the first setting area when the nearby object is human being is different from the planar shape of the first setting area when the nearby object is mobile robot.

16. The non-transitory computer readable medium according to claim 13, wherein in the first setting area or the second setting area, adding a fixed cost or the closer to the nearby object, more the cost is added in the grids, and a higher moving speed is, more the cost is added.

17. The non-transitory computer readable medium according to claim 13, wherein the intersection is a three-way intersection, the second setting area has a fourth end and fifth end, the fourth end is set as a point separated from the detection position by the fourth distance in an extending direction, the fifth end is set as a point separated from the detection position by a fifth distance in a direction opposite to the extending direction, and in a planar view, the extending direction is a direction extending from the first passage to the second passage.

18. The non-transitory computer readable medium according to claim 13, wherein the first setting area and the second setting area are fixed area having an elliptical shape or rectangular shape.

* * * * *